US012719626B2

(12) United States Patent
Wu et al.

(10) Patent No.: US 12,719,626 B2
(45) Date of Patent: Aug. 25, 2026

(54) TRANSMIT DIVERSITY FOR SIDELINK COMMUNICATIONS IN UNLICENSED SPECTRUM

(71) Applicant: QUALCOMM Incorporated, San Diego, CA (US)

(72) Inventors: Shuanshuan Wu, San Diego, CA (US); Arthur Gubeskys, San Diego, CA (US); Stelios Stefanatos, San Diego, CA (US); Parisa Cheraghi, Cambridge (GB)

( * ) Notice: Subject to any disclaimer, the term of this patent is extended or adjusted under 35 U.S.C. 154(b) by 265 days.

(21) Appl. No.: 18/253,195

(22) PCT Filed: Jan. 11, 2022

(86) PCT No.: PCT/US2022/012024
§ 371 (c)(1),
(2) Date: May 16, 2023

(87) PCT Pub. No.: WO2022/164630
PCT Pub. Date: Aug. 4, 2022

(65) Prior Publication Data

US 2024/0014954 A1 Jan. 11, 2024

(30) Foreign Application Priority Data

Jan. 28, 2021 (GR) .............................. 20210100052

(51) Int. Cl.
*H04L 5/00* (2006.01)
*H04W 72/232* (2023.01)

(52) U.S. Cl.
CPC .......... *H04L 5/001* (2013.01); *H04W 72/232* (2023.01)

(58) Field of Classification Search
CPC ............................ H04W 72/232; H04L 5/001
See application file for complete search history.

(56) References Cited

U.S. PATENT DOCUMENTS

2019/0150164 A1 5/2019 Nam et al.
2019/0215685 A1* 7/2019 Wang ...................... H04W 4/40
2019/0239178 A1* 8/2019 Shilov ................ H04W 56/002
(Continued)

OTHER PUBLICATIONS

International Search Report and Written Opinion—PCT/US2022/012024—ISA/EPO—Jul. 11, 2022 (2100975WO).
(Continued)

*Primary Examiner* — Andrew Lee

(57) ABSTRACT

Methods, systems, and devices for wireless communications are described. A user equipment (UE) may identify a transmit diversity configuration for transmitting multiple sidelink messages. The UE may identify a transmit diversity configuration that indicates a set of component carriers (CCs) available for sidelink communication. The UE may transmit, based on the transmit diversity configuration, a first sidelink message having a first redundancy version (RV) of a transport block (TB), and a second sidelink message having a second RV of the TB, on multiple CCs. In a second case, the UE may identify a transmit diversity configuration indicating a set of precoding matrices. The UE may transmit the first sidelink message, including a TB or an RV of a TB, precoded using a first precoding matrix and a second sidelink message, including a TB or an RV of a TB, precoded using a second precoding matrix on multiple CCs.

29 Claims, 13 Drawing Sheets

(56) References Cited

U.S. PATENT DOCUMENTS

| | | | | |
|---|---|---|---|---|
| 2019/0356430 | A1* | 11/2019 | Cheng | H04L 1/1896 |
| 2020/0244424 | A1 | 7/2020 | Froberg et al. | |
| 2020/0329352 | A1* | 10/2020 | Wang | H04L 67/12 |
| 2020/0351859 | A1* | 11/2020 | Chae | H04W 72/20 |
| 2021/0050931 | A1* | 2/2021 | Hahn | H04L 5/0007 |
| 2021/0160818 | A1* | 5/2021 | Chae | H04W 72/0453 |
| 2022/0124679 | A1* | 4/2022 | Ye | H04W 72/02 |
| 2023/0094711 | A1* | 3/2023 | Wu | H04L 1/1887 370/329 |
| 2023/0262660 | A1* | 8/2023 | Park | H04L 5/0094 370/329 |
| 2024/0155970 | A1* | 5/2024 | Plattner | A01B 79/02 |

OTHER PUBLICATIONS

Lien S-Y., et al., "3GPP NR Sidelink Transmissions Toward 5G V2X", IEEE Access, Special Section on Communication and Fog/Edge Computing Towards Intelligent Connected Vehicles (ICVS), Received Dec. 17, 2019, Accepted Jan. 22, 2020, date of publication Feb. 13, 2020, date of current version Feb. 28, 2020, vol. 8, XP011774398, Doi: 10.1109/ACCESS.2020.2973706, pp. 35368-35382.

Partial International Search Report—PCT/US2022/012024—ISA/EPO—May 18, 2022 (2100975WO).

* cited by examiner

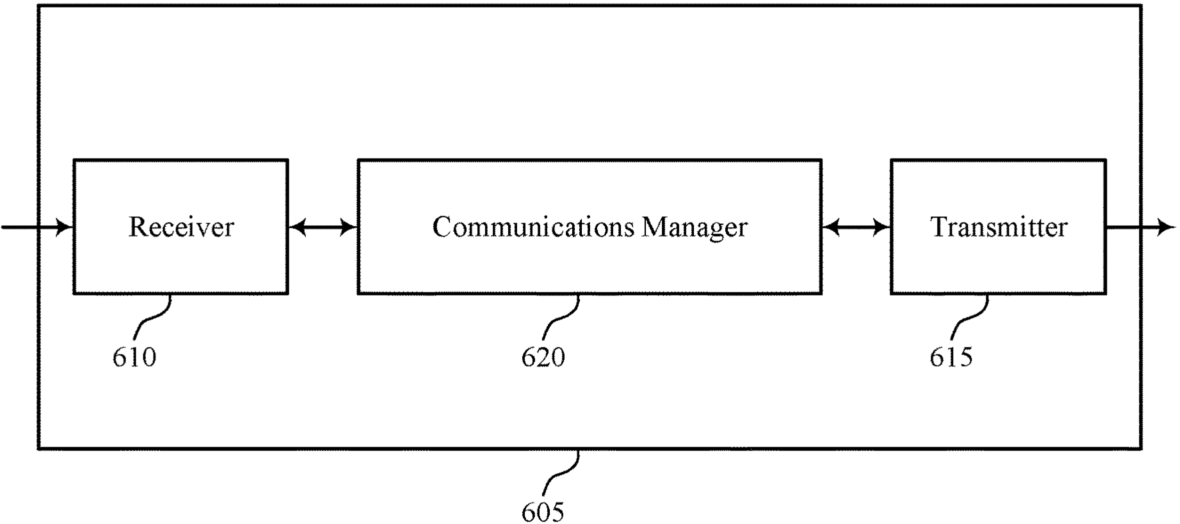
FIG. 6

Figure 12:
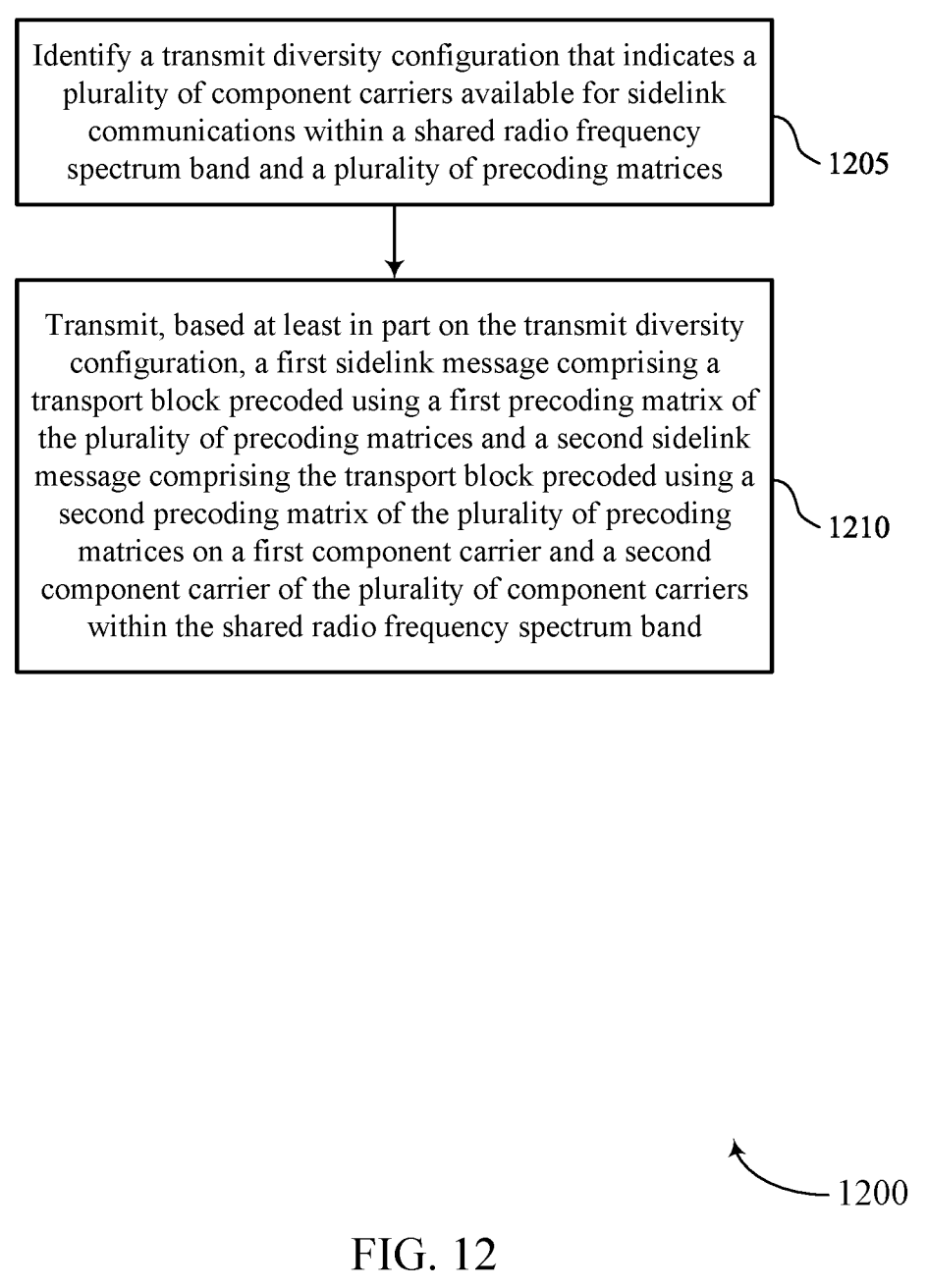

Identify a transmit diversity configuration that indicates a plurality of component carriers available for sidelink communications within a shared radio frequency spectrum band and a plurality of precoding matrices

1205

Transmit, based at least in part on the transmit diversity configuration, a first sidelink message comprising a transport block precoded using a first precoding matrix of the plurality of precoding matrices and a second sidelink message comprising the transport block precoded using a second precoding matrix of the plurality of precoding matrices on a first component carrier and a second component carrier of the plurality of component carriers within the shared radio frequency spectrum band

TRANSMIT DIVERSITY FOR SIDELINK COMMUNICATIONS IN UNLICENSED SPECTRUM

CROSS REFERENCE

The present application is a 371 national stage filing of International PCT Application No. PCT/US2022/012024 by WU et al. entitled "TRANSMIT DIVERSITY FOR SIDELINK COMMUNICATIONS IN UNLICENSED SPECTRUM," filed Jan. 11, 2022; and claims priority to Greece Patent Application No. 20210100052 by WU et al., entitled "TRANSMIT DIVERSITY FOR SIDELINK COMMUNICATIONS IN UNLICENSED SPECTRUM," filed Jan. 28, 2021, each of which is assigned to the assignee hereof, and each of which is expressly incorporated by reference in its entirety herein.

FIELD OF TECHNOLOGY

The following relates to wireless communications, including transmit diversity for sidelink communications in unlicensed spectrum.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate in a sidelink communications system, such as a vehicle-to-everything (V2X) wireless communications system. A V2X or sidelink communication network may operate in an unlicensed spectrum. The UE may transmit sidelink messages to and from other UEs or vehicles in the system.

SUMMARY

The described techniques relate to improved methods, systems, devices, and apparatuses that support transmit diversity for sidelink communications in unlicensed spectrum. Generally, the described techniques provide for a user equipment (UE) determining a transmit diversity configuration, and transmitting multiple sidelink messages according to the transmit diversity configuration. In a first example, a UE may identify a transmit diversity configuration that indicates a set of component carriers (CCs) available for sidelink communication within a shared radio frequency spectrum band that configures the UE to transmit different redundancy versions (RVs) of a transport block (TB) on multiple CCs of the set of CCs. The UE may transmit based on the transmit diversity configuration, a first sidelink message having a first RV of a data packet, such as a TB, and a second sidelink message having a second RV of the TB on a first CC and a second CC of the set of CCs within the shared radio frequency spectrum band. In an example, the UE may transmit the first sidelink message on the first CC, and the second sidelink message on the second CC. In a second example, a UE may identify a transmit diversity configuration that indicates a set of CCs available for sidelink communications within a shared radio frequency spectrum band and a set of precoding matrices. The transmit diversity configuration may configure the UE to apply which multiple different precoding matrices of the set of precoding matrices to precode a sidelink message for transmission on multiple CCs of the set of CCs. The UE may transmit, based on the transmit diversity configuration, a first sidelink message precoded using a first precoding matrix of the set of precoding matrices and a second sidelink message precoded using a second precoding matrix of the set of precoding matrices on a first CC and a second CC of the set of CCs within the shared radio frequency spectrum band. The first and second sidelink messages may include the same TB (e.g., packet, set of information bits), or different RVs generated based on channel coding of the same TB, but are precoded using a different precoding matrix.

A method for wireless communications at a UE is described. The method may include identifying a transmit diversity configuration that indicates a set of multiple CCs available for sidelink communication within a shared radio frequency spectrum band and transmitting, based on the transmit diversity configuration, a first sidelink message having a first RV of a TB and a second sidelink message having a second RV of the TB on a first CC and a second CC of the set of multiple CCs within the shared radio frequency spectrum band.

An apparatus for wireless communications at a UE is described. The apparatus may include a processor, memory coupled with the processor, and instructions stored in the memory. The instructions may be executable by the processor to cause the apparatus to identify a transmit diversity configuration that indicates a set of multiple CCs available for sidelink communication within a shared radio frequency spectrum band and transmit, based on the transmit diversity configuration, a first sidelink message having a first RV of a TB and a second sidelink message having a second RV of the TB on a first CC and a second CC of the set of multiple CCs within the shared radio frequency spectrum band.

Another apparatus for wireless communications at a UE is described. The apparatus may include means for identifying a transmit diversity configuration that indicates a set of multiple CCs available for sidelink communication within a shared radio frequency spectrum band and means for transmitting, based on the transmit diversity configuration, a first sidelink message having a first RV of a TB and a second sidelink message having a second RV of the TB on a first CC and a second CC of the set of multiple CCs within the shared radio frequency spectrum band.

A non-transitory computer-readable medium storing code for wireless communications at a UE is described. The code may include instructions executable by a processor to identify a transmit diversity configuration that indicates a set of multiple CCs available for sidelink communication within a shared radio frequency spectrum band and transmit, based on the transmit diversity configuration, a first sidelink messagesage having a first RV of a TB and a second sidelink message having a second RV of the TB on a first CC and a second CC of the set of multiple CCs within the shared radio frequency spectrum band.

In some examples of the method, apparatuses, and non-transitory computer-readable medium described herein, identifying the transmit diversity configuration may include operations, features, means, or instructions for receiving a control message indicating the transmit diversity configuration.

Some examples of the method, apparatuses, and non-transitory computer-readable medium described herein may further include operations, features, means, or instructions for receiving a sidelink control information message indicating the first CC and the second CC.

In some examples of the method, apparatuses, and non-transitory computer-readable medium described herein, the transmitting may include operations, features, means, or instructions for transmitting the first sidelink message on the first CC and transmitting the second sidelink message on the second CC.

Some examples of the method, apparatuses, and non-transitory computer-readable medium described herein may further include operations, features, means, or instructions for receiving a sidelink control information message indicating that a third sidelink message and a fourth sidelink message respectively transport a third RV and a fourth RV of a second TB and decoding the second TB based on monitoring a third CC for the third sidelink message, monitoring a fourth CC for the fourth sidelink message, or both.

Some examples of the method, apparatuses, and non-transitory computer-readable medium described herein may further include operations, features, means, or instructions for transmitting a sidelink control message indicating that the first CC and the second CC respectively transport the first RV and the second RV of the TB.

In some examples of the method, apparatuses, and non-transitory computer-readable medium described herein, the transmitting may include operations, features, means, or instructions for transmitting the first sidelink message having the first RV of the TB and the second sidelink message having the second RV of the TB that differs from the first RV.

In some examples of the method, apparatuses, and non-transitory computer-readable medium described herein, the transmitting may include operations, features, means, or instructions for transmitting the first sidelink message having the first RV of the TB on the first CC according to a first precoding matrix and the second sidelink message having the second RV of the TB on the second CC according to a second precoding matrix.

In some examples of the method, apparatuses, and non-transitory computer-readable medium described herein, the transmitting may include operations, features, means, or instructions for transmitting the first sidelink message on the first CC and the second CC according to a first precoding matrix and the second sidelink message on the first CC and the second CC according to a second precoding matrix.

In some examples of the method, apparatuses, and non-transitory computer-readable medium described herein, the transmitting may include operations, features, means, or instructions for transmitting the first sidelink message that includes first bits of a code block generated based on the TB and transmitting the second sidelink message that includes second bits of the code block that differ from the first bits.

In some examples of the method, apparatuses, and non-transitory computer-readable medium described herein, the first bits include one or more first systematic bits of the code block and the second bits include one or more second systematic bits of the code block that differ from the one or more first systematic bits of the code block.

In some examples of the method, apparatuses, and non-transitory computer-readable medium described herein, the first bits include one or more first systematic bits of the code block and the second bits include one or more parity bits of the code block.

In some examples of the method, apparatuses, and non-transitory computer-readable medium described herein, the first bits include systematic bits of the code block and first parity bits of the code block and the second bits include the systematic bits of the code block and second parity bits of the code block that differ from the first parity bits.

In some examples of the method, apparatuses, and non-transitory computer-readable medium described herein, the transmit diversity configuration indicates a set of multiple RVs, and each RV of the set of multiple RVs corresponds to a different starting location in a circular buffer.

Some examples of the method, apparatuses, and non-transitory computer-readable medium described herein may further include operations, features, means, or instructions for transmitting, via the first CC, a first sidelink control message including an indication that the first sidelink message may be the first RV of the TB and transmitting, via the second CC, a second sidelink control message including an indication that the second sidelink message may be the second RV of the TB.

Some examples of the method, apparatuses, and non-transitory computer-readable medium described herein may further include operations, features, means, or instructions for identifying the transmit diversity configuration based on an index of the first CC and an index of the second CC.

Some examples of the method, apparatuses, and non-transitory computer-readable medium described herein may further include operations, features, means, or instructions for performing a channel access procedure on each CC of the set of multiple CCs, where the first CC and the second CC may be selected based on the channel access procedure.

A method for wireless communications at a UE is described. The method may include identifying a transmit diversity configuration that indicates a set of multiple CCs available for sidelink communications within a shared radio frequency spectrum band and a set of multiple precoding matrices and transmitting, based on the transmit diversity configuration, a first sidelink message including a TB precoded using a first precoding matrix of the set of multiple precoding matrices and a second sidelink message including the TB precoded using a second precoding matrix of the set of multiple precoding matrices on a first CC and a second CC of the set of multiple CCs within the shared radio frequency spectrum band.

An apparatus for wireless communications at a UE is described. The apparatus may include a processor, memory coupled with the processor, and instructions stored in the memory. The instructions may be executable by the processor to cause the apparatus to identify a transmit diversity configuration that indicates a set of multiple CCs available for sidelink communications within a shared radio frequency spectrum band and a set of multiple precoding matrices and transmit, based on the transmit diversity configuration, a first sidelink message including a TB precoded using a first precoding matrix of the set of multiple precoding matrices and a second sidelink message including the TB precoded using a second precoding matrix of the set of multiple precoding matrices on a first CC and a second CC of the set of multiple CCs within the shared radio frequency spectrum band.

Another apparatus for wireless communications at a UE is described. The apparatus may include means for identifying a transmit diversity configuration that indicates a set of multiple CCs available for sidelink communications within a shared radio frequency spectrum band and a set of multiple precoding matrices and means for transmitting, based on the transmit diversity configuration, a first sidelink message including a TB precoded using a first precoding matrix of the set of multiple precoding matrices and a second sidelink message including the TB precoded using a second precoding matrix of the set of multiple precoding matrices on a first CC and a second CC of the set of multiple CCs within the shared radio frequency spectrum band.

A non-transitory computer-readable medium storing code for wireless communications at a UE is described. The code may include instructions executable by a processor to identify a transmit diversity configuration that indicates a set of multiple CCs available for sidelink communications within a shared radio frequency spectrum band and a set of multiple precoding matrices and transmit, based on the transmit diversity configuration, a first sidelink message including a TB precoded using a first precoding matrix of the set of multiple precoding matrices and a second sidelink message including the TB precoded using a second precoding matrix of the set of multiple precoding matrices on a first CC and a second CC of the set of multiple CCs within the shared radio frequency spectrum band.

In some examples of the method, apparatuses, and non-transitory computer-readable medium described herein, the transmitting may include operations, features, means, or instructions for transmitting, via the first CC, the first sidelink message precoded using the first precoding matrix that may be selected based on an index of the first CC and transmitting, via the second CC, the second sidelink message precoded using the second precoding matrix that may be selected based on an index of the second CC.

Some examples of the method, apparatuses, and non-transitory computer-readable medium described herein may further include operations, features, means, or instructions for receiving a control message indicating the transmit diversity configuration, the first CC, the second CC, or any combination thereof.

In some examples of the method, apparatuses, and non-transitory computer-readable medium described herein, the transmitting may include operations, features, means, or instructions for transmitting the first sidelink message that includes a first RV of the TB and the second sidelink message that includes a second RV of the TB.

In some examples of the method, apparatuses, and non-transitory computer-readable medium described herein, the transmitting may include operations, features, means, or instructions for transmitting the first sidelink message that may be precoded using the first precoding matrix to generate a first two-antenna single layer transmission and transmitting the second sidelink message that may be precoded using the second precoding matrix to generate a second two-antenna single layer transmission.

Some examples of the method, apparatuses, and non-transitory computer-readable medium described herein may further include operations, features, means, or instructions for transmitting the first sidelink message using a first antenna port of the UE and transmitting the second sidelink message using a second antenna port of the UE.

Some examples of the method, apparatuses, and non-transitory computer-readable medium described herein may further include operations, features, means, or instructions for generating a first set of multiple modulation symbols for the first sidelink message and a second set of multiple modulation symbols for the second sidelink message, precoding the first set of multiple modulation symbols based on the first precoding matrix to generate a first set of multiple precoded symbols and the second set of multiple modulation symbols based on the second precoding matrix to generate a second set of multiple precoded symbols, first mapping the first set of multiple precoded symbols to respective subcarriers of a first set of multiple subcarriers of the first CC, and second mapping the second set of multiple precoded symbols to respective subcarriers of a second set of multiple subcarriers of the second CC, where the first sidelink message may be communicated via the first CC in accordance with the first mapping and the second sidelink message may be communicated via the second CC in accordance with the second mapping.

In some examples of the method, apparatuses, and non-transitory computer-readable medium described herein, the transmitting may include operations, features, means, or instructions for transmitting the first sidelink message precoded using the first precoding matrix that may be randomly selected from the set of multiple precoding matrices and transmitting the second sidelink message precoded using the second precoding matrix that may be randomly selected from the set of multiple precoding matrices.

Some examples of the method, apparatuses, and non-transitory computer-readable medium described herein may further include operations, features, means, or instructions for performing a channel access procedure on the set of multiple CCs and selecting the first CC and the second CC based on the channel access procedure.

Some examples of the method, apparatuses, and non-transitory computer-readable medium described herein may further include operations, features, means, or instructions for generating a first set of multiple modulation symbols based on the first sidelink message, precoding the first set of multiple modulation symbols to generate a first set of multiple precoded modulation symbols based on the first precoding matrix, and mapping a respective precoded modulation symbol of the first set of multiple precoded modulation symbols to at least one of the first CC or the second CC, where the first sidelink message may be communicated via the first CC and the second CC based on the mapping of the first set of multiple precoded modulation symbols.

Some examples of the method, apparatuses, and non-transitory computer-readable medium described herein may further include operations, features, means, or instructions for generating a second set of multiple modulation symbols based on the second sidelink message, precoding the second set of multiple modulation symbols to generate a second set of multiple precoded modulation symbols based on the second precoding matrix, and mapping a respective precoded modulation symbol of the second set of multiple precoded modulation symbols to at least one of the first CC or the second CC, where the second sidelink message may be communicated via the first CC and the second CC based on the mapping of the second set of multiple precoded modulation symbols.

BRIEF DESCRIPTION OF THE DRAWINGS

FIGS. 6 and 7 show block diagrams of devices in accordance with aspects of the present disclosure.

FIGS. 10 through 13 show flowcharts illustrating methods in unlicensed spectrum in accordance with aspects of the present disclosure.

DETAILED DESCRIPTION

Figure 1:
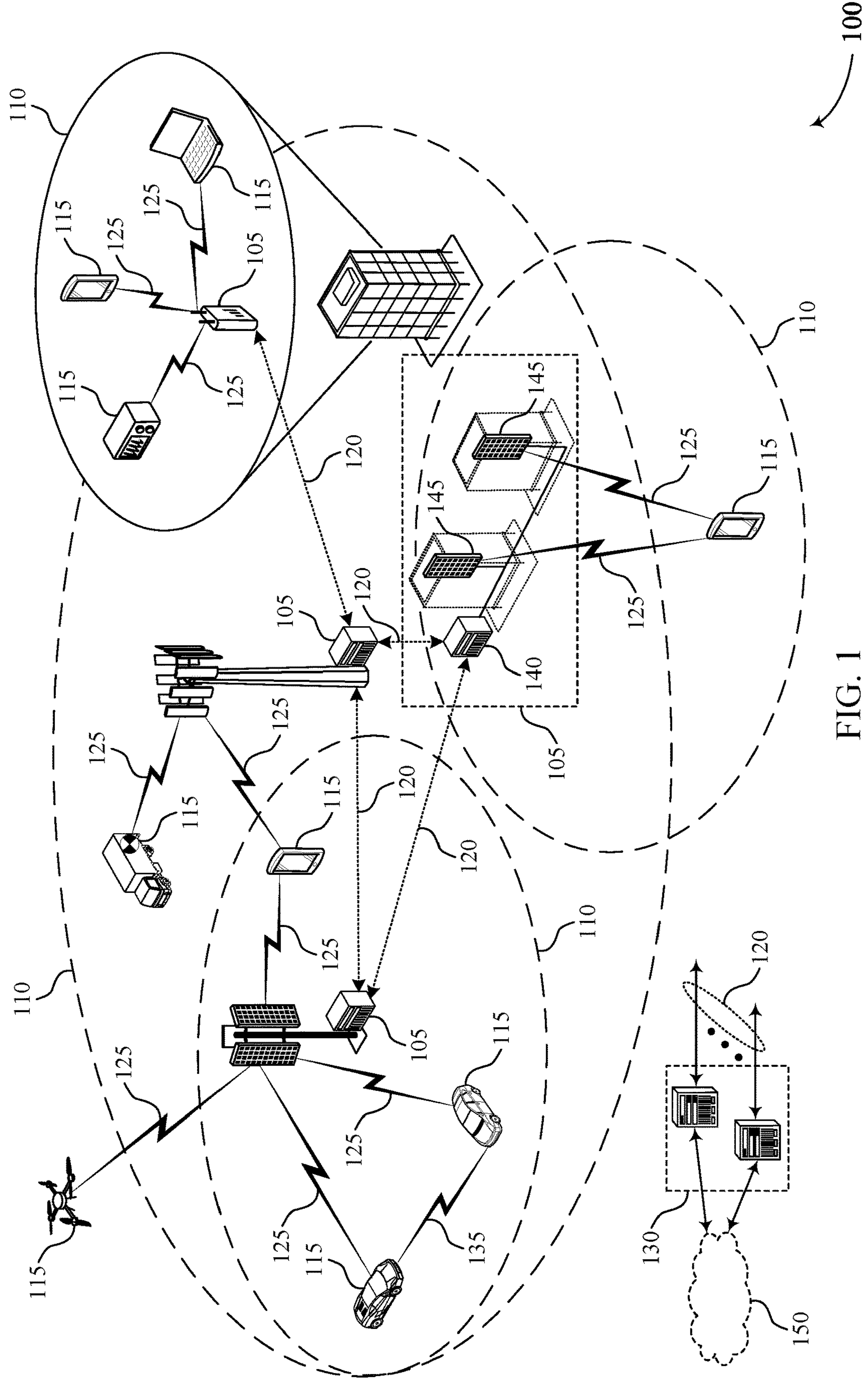
FIG. 1 illustrates an example of a wireless communications system that supports transmit diversity for sidelink communications in unlicensed spectrum in accordance with aspects of the present disclosure.

In some wireless communications systems, a user equipment (UE) and another UE may communicate with each other (e.g., using new radio (NR), NR unlicensed (NR-U), or the like). In some examples, the UEs may communicate in an unlicensed frequency band. The unlicensed frequency band may be shared by other radio access technologies (RATs) (e.g., Wi-Fi, long-term evolution (LTE), or the like). In some examples, both UEs may communicate in a licensed spectrum band (e.g., a licensed cellular band, a dedicated intelligent transportation system (ITS) spectrum band, or the like). In some cases, both UEs may communicate using sidelink channels in a cellular vehicle-to-vehicle (V2V) or vehicle-to-everything (V2X) mode over a single candidate carrier (CC). However, UEs that communicate in the unlicensed frequency band may experience interference due to other signaling, which may be due to other devices that that may communicating in the system.

A transmitting UE may determine that a channel is idle based on a channel access procedure (e.g., a listen-before-talk (LBT) procedure or a clear channel assessment (CCA) procedure) and may transmit a signal to a receiving UE. However, the receiving UE may be unable to receive the transmission due to interference at the receiving UE, or between the transmitting and receiving UE. The interference may be caused by radio-frequency (RF) interference.

In some examples, interference may vary based on the location of the receiving UE. For example, the transmitting UE may broadcast or groupcast the transmission to one or more receiving UEs at different locations, and each receiving UE may experience varying levels of interference when attempting to receive the transmission. The transmitting UE may transmit a data packet concurrently over multiple CCs to increase transmission reliability and performance, but interference issues may persist.

In some examples, a first UE may transmit data (e.g., a transport block (TB), a data packet, a set of information bits, or the like) in a sidelink message across a sidelink channel concurrently over multiple CCs to a second UE. Each transmission over each CC may be distinct from each other transmission, which may increase transmission reliability and performance. For example, the first UE may transmit different redundancy versions (RVs) generated by encoding the same data (e.g., a TB, a data packet, or the like), and transmit sidelink messages having different RVs on multiple different component carriers (CCs). Additionally or alternatively, the first UE may apply a different precoding matrix to a sidelink message that includes the same data, or a different RV generated from the same data, for transmission of the differently precoded sidelink messages on multiple different CCs. In some cases, the first UE may randomly select each precoding matrix from a set of precoding matrices or may deterministically select each precoding matrix (e.g., based on each index of each CC).

Thus, a transmitting UE may transmit a sidelink message (e.g., a TB) over multiple CCs with different RVs, different precoding matrices, or both to increase transmission diversity and to reduce the likelihood that a receiving UE may experience interference at many or all of the CCs when attempting to receive the data.

Aspects of the disclosure are initially described in the context of wireless communications systems. Aspects of the disclosure are then described in the context of a transmit diversity configuration and process flows. Aspects of the disclosure are further illustrated by and described with reference to apparatus diagrams, system diagrams, and flowcharts that relate to transmit diversity for sidelink communications in unlicensed spectrum.

FIG. 1 illustrates an example of a wireless communications system 100 that supports transmit diversity for sidelink communications in unlicensed spectrum in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may determine a transmit diversity configuration, and may transmit multiple sidelink messages according to the transmit diversity configuration. In a first case, a UE 115 may identify a transmit diversity configuration that indicates a set of CCs available for sidelink communication within a shared radio frequency spectrum band. The UE 115 may transmit based on the transmit diversity configuration, a first sidelink message having a first RV of a TB and a second sidelink message having a second RV of the TB on a first CC and a second CC of the set of CCs within the shared radio frequency spectrum band. In a second case, a UE 115 may identify a transmit diversity configuration that indicates a set of CCs available for sidelink communications within a shared radio frequency spectrum band and a set of precoding matrices. The UE 115 may transmit, based on the transmit diversity configuration, a first sidelink message, including the data packet, precoded using a first precoding matrix of the set of precoding matrices and a second sidelink message, including the data packet, precoded using a second precoding matrix of the set of precoding matrices on a first CC and a second CC of the set of CCs within the shared radio frequency spectrum band. As it is less likely that an receiving UE is experiencing severe interference at multiple CCs at the same time, parallel transmission over multiple CCs may improve communication reliability, such as V2X communication reliability. Moreover, the techniques described herein may achieve diversity gain for a receiving UE that performs decoding based on a combination of signals received multiple CCs.

Figure 2:
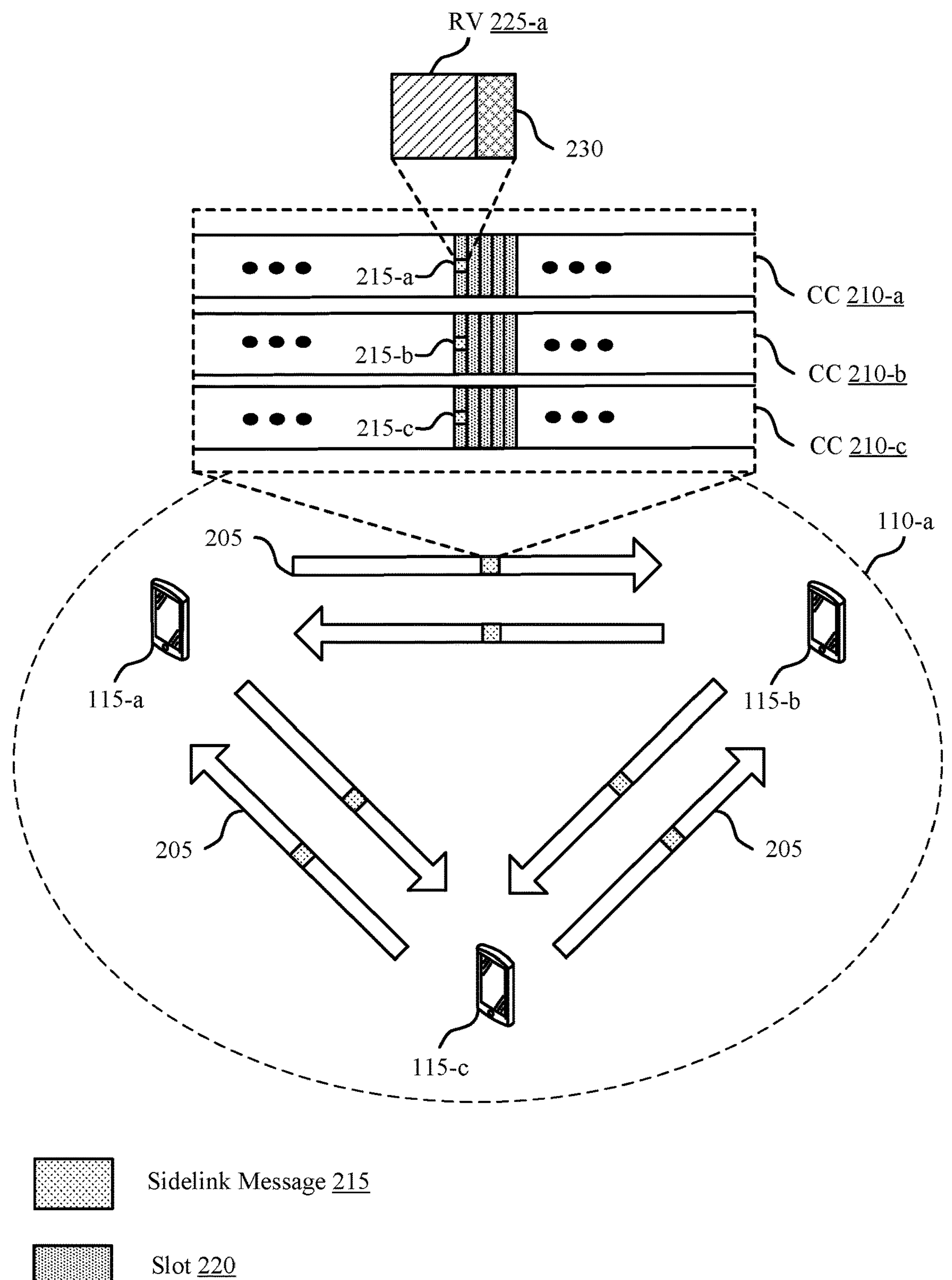
FIG. 2 illustrates an example of a wireless communications system in accordance with aspects of the present disclosure.

FIG. 2 illustrates an example of a wireless communications system 200 that supports transmit diversity for sidelink communications in unlicensed spectrum in accordance with aspects of the present disclosure. In some examples, the wireless communications system 200 may implement aspects of the wireless communications system 100. Wireless communications system 200 may include UE 115-*a*, UE 115-*b*, and UE 115-*c* which may be examples of UEs 115. Coverage area 110-*a* may be an example of a coverage area 110 as described with reference to FIG. 1. In some cases, UE 115-*a*, UE 115-*b*, UE 115-*c*, or a combination of these may communicate by receiving control signaling or data via sidelink channels 205, transmitting control signaling or data via sidelink channels 205, or both. For example, UE 115-*a* may transmit, receive, or both transmit and receive a sidelink message, which may include data (e.g., a data packet, a set of information bits, or a TB) over multiple channels (e.g., CCs). In some cases, UE 115-*a* may transmit multiple sidelink messages, where each sidelink message includes a different RV of multiple RVs generated from a same packet (e.g., a TB, a set of information bits, etc.). In some cases, UE 115-*a* may apply different precoding matrices to the sidelink messages for transmission on multiple CCs.

Some sidelink communications (e.g., NR V2X communications, LTE V2X communications, or the like) may be designed to target deployment in a licensed spectrum (e.g., a licensed spectrum band), where the sidelink communications (e.g., over sidelink channels 205) may either share the licensed spectrum in a licensed cellular band or may use a dedicated ITS spectrum. In a licensed cellular spectrum, the sidelink communications (e.g., V2X) may share an uplink spectrum in a cellular network, while a dedicated ITS spectrum may represent one or more spectrums around a frequency range (e.g., around 5.9 GHz) that may be allocated for sidelink communications (e.g., V2X), in some regions or countries.

In some cases, a dedicated spectrum for sidelink communications (e.g., V2X) may be scarce or unavailable (e.g., may not be guaranteed) in some regions, for example, based on a scarcity of spectrum. For example, in some areas or countries, there may be a dedicated spectrum allocated for first sidelink communications (e.g., LTE V2X), but limited spectrum (e.g., some or no spectrum) may be available for second sidelink communications (e.g., NR V2X, which may target V2X usage cases such as autonomous driving).

As such, some cellular sidelink communications (e.g., some cellular V2X communications) may be deployed in unlicensed spectrum, for example, based on being an only feasible option in some regions. Unlicensed spectrum may be shared with other communications technologies, such as Wi-Fi, and in some cases may be referred to as shared spectrum or a shared radio frequency spectrum band. A range of unlicensed spectrums may be available for sidelink communications, for example, from 5 GHz to 6 GHz. For example, unlicensed national information infrastructure (U-NII) bands may be available, such as U-NII-3 spectrum (e.g., from 5.725 GHz to 5.850 GHz) or U-NII-4 spectrum (e.g., from 5.850 GHz to 5.925 GHz), or spectrum at or above 6 GHz may be available.

In unlicensed spectrum, a minimum channel bandwidth may be specified, for example, following regional regulations (e.g., some regions may have a minimum channel bandwidth of 5 MHz). A device (e.g., a device using any technology) may transmit in a bandwidth (e.g., a minimum channel bandwidth) within unlicensed spectrum. For example, a device may transmit with a channel bandwidth of 20 MHz, 80 MHz, or 160 MHz, among other examples.

Channel access procedures may be performed before transmitting using unlicensed spectrum (e.g., NR-U) and may, for example, include channel access types such as a type 1 channel access or a type 2 channel access. A type 1 channel access may, for example, include a random time duration spanned by sensing slots that are sensed by a UE 115 to be idle before one or more sidelink transmissions (e.g., which may be referred to as a category 4 (CAT 4) LBT procedure). A type 2 channel access may include a deterministic time duration spanned by sensing slots that are sensed by a UE 115 to be idle before one or more sidelink transmissions. For example, a type 2A channel access may have a sensing duration of 25 microseconds (μs), a type 2B channel access may have a sensing duration of 16 μs, and a type 2C channel accessing may perform no sensing (e.g., which may be applied when a gap is no larger than 16 μs).

In some cases in NR-U, a base station 105 may initiate a channel occupancy (e.g., a channel occupancy time (COT)), for example, based on type 1 channel access. In some cases, a UE 115 may share the channel occupancy, where the UE 115 may perform type 2 channel access before one or more intended transmissions. In such cases, the UE 115 may transmit if the type 2 channel access is successful. For sidelink communications in unlicensed spectrum, a UE 115 may initiate a channel occupancy, for example, based on a type 1 channel access, where another UE 115 may share the channel occupancy (e.g., may transmit in the channel occupancy based on a type 2 channel access).

In some examples, increased transmission reliability and performance may be desirable for V2X communications in an unlicensed spectrum (e.g., in situations where a transmitting UE 115 may transmit a safety message to be successfully delivered to a receiving UE 115), but may be limited due to interference experienced (e.g., due to other RATs or technologies) at receiving UEs 115. In some examples, a transmitting UE 115 may perform a channel access procedure (e.g., a LBT procedure) on a channel and may determine that the channel is idle and available for transmission (e.g., the channel may have no interference or low interference). However, a receiving UE 115 may not determine that the channel is idle and available for transmission and may thus experience interference when attempting to receive a transmission. In some other examples, interference experienced at receiving UEs 115 may be location dependent. For example, a transmitting UE 115 may broadcast or groupcast a transmission to one or more receiving UEs 115, and the receiving UEs 115 may be located at different locations and may experience different interference amounts when attempting to receive the broadcast or groupcast transmission. In some cases, the transmitting UE 115 may transmit a message over a sidelink channel over a single CC. In some other cases, the transmitting UE 115 may transmit (e.g., concurrently transmit) a message over multiple CCs to improve transmission reliability and performance due to the decreased likelihood of the receiving UE 115 experiencing high amounts of interference at all of the CCs used for transmission. However, reliability and performance issues due to interference may persist.

In some examples, UE 115-*a* may concurrently communicate (e.g., by transmitting, receiving, or both) with UE 115-*b*, UE 115-*c*, or a combination of these (e.g., using V2X) over sidelink channels 205 over multiple CCs 210 using one or more schemes described herein. In some examples, UE 115-*a* may perform a channel access procedure (e.g., an LBT procedure) on each CC 210 (e.g., prior to communicating over the CCs 210) and may determine the CCs 210 that are idle and available for transmission. In some cases, UEs 115 may communicate in an unlicensed spectrum shared by multiple RATs or may communicate in a licensed spectrum. In some examples, UEs 115 operating in the unlicensed spectrum may be configured with a set of defined frequencies (e.g., a set of defined candidate CCs 210) for sidelink communications (e.g., V2X) using the unlicensed spectrum (e.g., as defined by a wireless communications standard). The set of frequencies may be channelized to a number of CCs (e.g., the set of candidate CCs 210), and each CC 210 may have a defined bandwidth (e.g., 20 MHz). In some examples, the set of candidate CCs 210 may include a first CC 210-*a* (e.g., CC0), a second CC 210-*b* (e.g., CC1), and a third CC 210-*c* (e.g., CC2), among other CCs 210.

In some examples, UE 115-*a* transmit a sidelink message 215 over a sidelink channel 205 to UE 115-*b* and may indicate that the transmission is a multi-CC transmission. In some cases, UE 115-*a* may include the indication in one or more parameters of sidelink control information (SCI) (e.g., via an SCI message, or the like) transmitted over each CC 210. For example, UE 115-*a* may transmit data (e.g., a data packet, a set of information bits, or a TB) over four CCs 210 and may transmit SCI over each of the four CCs 210. Each SCI in each CC 210 may indicate the four CCs 210 used for transmission. Thus, if UE 115-*b* receives the SCI over at least one of the CCs 210, UE 115-*b* may be able to determine that the transmission is a multi-CC transmission and may be able to identify and decode the remaining three CCs 210.

In some cases, UE 115-*a* may transmit multiple sidelink messages 215 in slots 220 over multiple CCs 210 where each sidelink messages 215 include a different RV 225 generated from a same TB (e.g., a packet, a set of information bits, etc.). Additionally or alternatively, UE 115-*a* may multiple sidelink messages 215 each sidelink message is precoded using a different precoding matrix. UE 115-*b* may decode at least one of the transmissions over the CCs 210 or decode a combination of transmissions over the CCs 210. For example, each sidelink message transmitted over the CCs 210 may experience a level of interference, and UE 115-*b* may be able to combine decoded information from the transmissions to successfully receive the same TB from the RVs 225 communicated in the respective sidelink messages 215. For example, UE 115-*b* may decode a first sidelink message 215-*a* from UE 115-*a* transmitted over CC 210-*a* that includes a first RV 225 of a TB and a second sidelink message 215-*b* from UE 115-*a* transmitted over CC 210-*b* that includes a second RV 225 of the same TB.

In some cases, UE 115-*a* may transmit a sidelink message 215 to UE 115-*b* via multiple CCs of a sidelink channel 205.

UE 115-*a* may generate different RVs of a TB, and transmit the different RVs 225 in different sidelink messages 215 over multiple CCs. In some cases, sidelink messages 215 may include other information 230 in addition to an RV 225. UE 115-*a* may generate the different RVs by encoding data such as a data packet (e.g., RV0, RV1, RV2, RV3, and the like, as defined by a wireless communications standard).

A wireless device (e.g., a UE 115, a base station 105, or the like) may also indicate to UE 115-*a* a starting point corresponding to which bits from a circular buffer to include in each RV of the RVs. In some examples, a wireless device may also indicate (e.g., via configuration, pre-configuration, or control signaling) which RV is to be transmitted on a given CC. Thus, a receiving UE 115 may be able to successfully receive and decode one or more RVs from a transmitting UE 115, based on the indication. In some cases, UE 115-*a* may include an indication in each transmission over each CC 210 of the RV 225 used in that transmission over that CC 210. For example, UE 115-*a* may transmit a first RV (e.g., RV0) on CC 210-*a* (e.g., CC0), and may transmit a second RV (e.g., RV1) on CC 210-*c* (e.g., CC2). UE 115-*a* may indicate in SCI on CC 210-*a* that the first RV 225 is being transmitted over CC 210-*a*, and may indicate in SCI on CC 210-*b* that the second RV 225 is being transmitted over CC 210-*b*.

In some cases, which RV 225 is transmitted on which CC 210 may be pre-determined (e.g., pre-configured or pre-defined). For example, an index of a CC 210 may implicitly indicate which RV 225 from a set of multiple RVs 225 is transported on which CC 210. For example, a lowest CC index of CCs 210-*a* to 210-*c* may imply that a lowest RV is transmitted on that CC (e.g., RV0 of the data is transmitted on CC 210-*a*), a next lowest CC index of CCs 210-*a* to 210-*c* may imply that a next lowest RV is transmitted on that CC (e.g., RV1 of the data is transmitted on CC 210-*b*), and so forth.

In some examples, RVs 225 may be transmitted on CCs 210 225 in a pre-determined order (e.g., RV0, RV2, RV3, and RV1). For example, if UE 115-*a* transmits over one CC 210, UE 115-*a* may transmit a first RV (e.g., RV0) of the pre-determined order on the one CC 210 (e.g., CC0). If UE 115-*a* transmits over two CCs 210, UE 115-*a* may transmit the first RV 225 (e.g., RV0) on a first CC (e.g., CC0) and a second RV 225 (e.g., RV2) a second CC 210 (e.g., CC1), and so forth. In these cases, a receiving UE 115 (e.g., UE 115-*b*) may be aware of which RV is being transmitted on which CC 210, and may decode the RVs from the respective CCs accordingly.

In some cases, UE 115-*a* may precode a sidelink message for transmission on multiple CCs using two or more different precoding matrices. For example, UE 115-*a* may apply a modulation scheme (e.g., binary phase shift keying (BPSK), 16 quadrature amplitude modulation (16-QAM), or the like) to the data (e.g., a TB) to generate the set of modulation symbols of the data. UE 115-*a* may apply a first precoding matrix to the set of modulation symbols of the data and UE 115-*a* may generate a first set of precoded modulation symbols. The UE 115-*a* may map the first set of precoded modulation symbols to subcarriers of a single CC 210 or multiple CCs 210, and transmit the first set of precoded modulation symbols based on the mapping. Similarly, UE 115-*a* may apply a second precoding matrix to the same set of modulation symbols of the data and UE 115-*a* may generate a second set of precoded modulation symbols. The UE 115-*a* may map the second set of precoded modulation symbols to subcarriers of a single CC 210 or multiple CCs 210, and transmit the second set of precoded modulation symbols based on the mapping.

In some examples, a wireless device (e.g., a base station 105, a transmitting UE 115, or the like) may randomly select one or more precoding matrices from a set of pre-determined precoding matrices for precoding of a sidelink message. In some other examples, the wireless device may deterministically select a one or more precoding matrices (e.g., based on each index of each CC 210). For example, UE 115-*a* may select (e.g., randomly or deterministically) a precoding matrix from four precoding matrices specified for a two-antenna single layer transmission. In the below example, the four precoding matrices may be specified for two-antenna single layer transmission:

$$\frac{1}{\sqrt{2}}\begin{pmatrix}1\\1\end{pmatrix}, \frac{1}{\sqrt{2}}\begin{pmatrix}1\\-1\end{pmatrix}, \frac{1}{\sqrt{2}}\begin{pmatrix}1\\j\end{pmatrix}, \frac{1}{\sqrt{2}}\begin{pmatrix}1\\-j\end{pmatrix}$$

In some cases, UE 115-*a* may transmit a sidelink message 215 to UE 115-*b* via a sidelink channel 205 that is precoded using one of these four precoding matrices.

In some examples, UE 115-*a* may perform space frequency block coding (SFBC) to symbols (e.g., modulation symbols) of a TB (e.g., a packet). UE 115-*a* may process a set of modulation symbols with block coding technique (precoding). The UE 115-*a* may then map the precoded symbols to different subcarriers ('F' in SFBC) and antennas ('S' in SFBC). In some example, instead of mapping the precoded symbols to different subcarriers, the precoded symbols may be mapped to different CCs.

For a two-antenna SFBC transmission in LTE (e.g., transmission mode 2), UE 115-*a* may perform SFBC on two modulation symbols $x_0$ and $x_1$ that are precoded as $x_0$, $-\text{conj}(x_1)$, $x_1$, $\text{conj}(x_0)$. UE 115-*a* may transmit $x_0$ and $x_1$ over two adjacent subcarriers from a first antenna port and may transmit the negative conjugate of $x_1$ and the conjugate of $x_0$ over the two adjacent subcarriers from a second antenna port. In some examples, UE 115-*a* may instead transmit $x_0$ and $x_1$ over two different CCs 210 from the first antenna port, and may transmit the negative conjugate of $x_1$ and the conjugate of $x_0$ over the two different CCs 210 from the second antenna port. In some examples, the UE 115-*a* may combine the RV and precoding matrix techniques described herein. For example, UE 115-*a* may transmit a sidelink message including a TB (e.g., a packet) over multiple CCs using different RVs and different precoding matrices.

Figure 3:
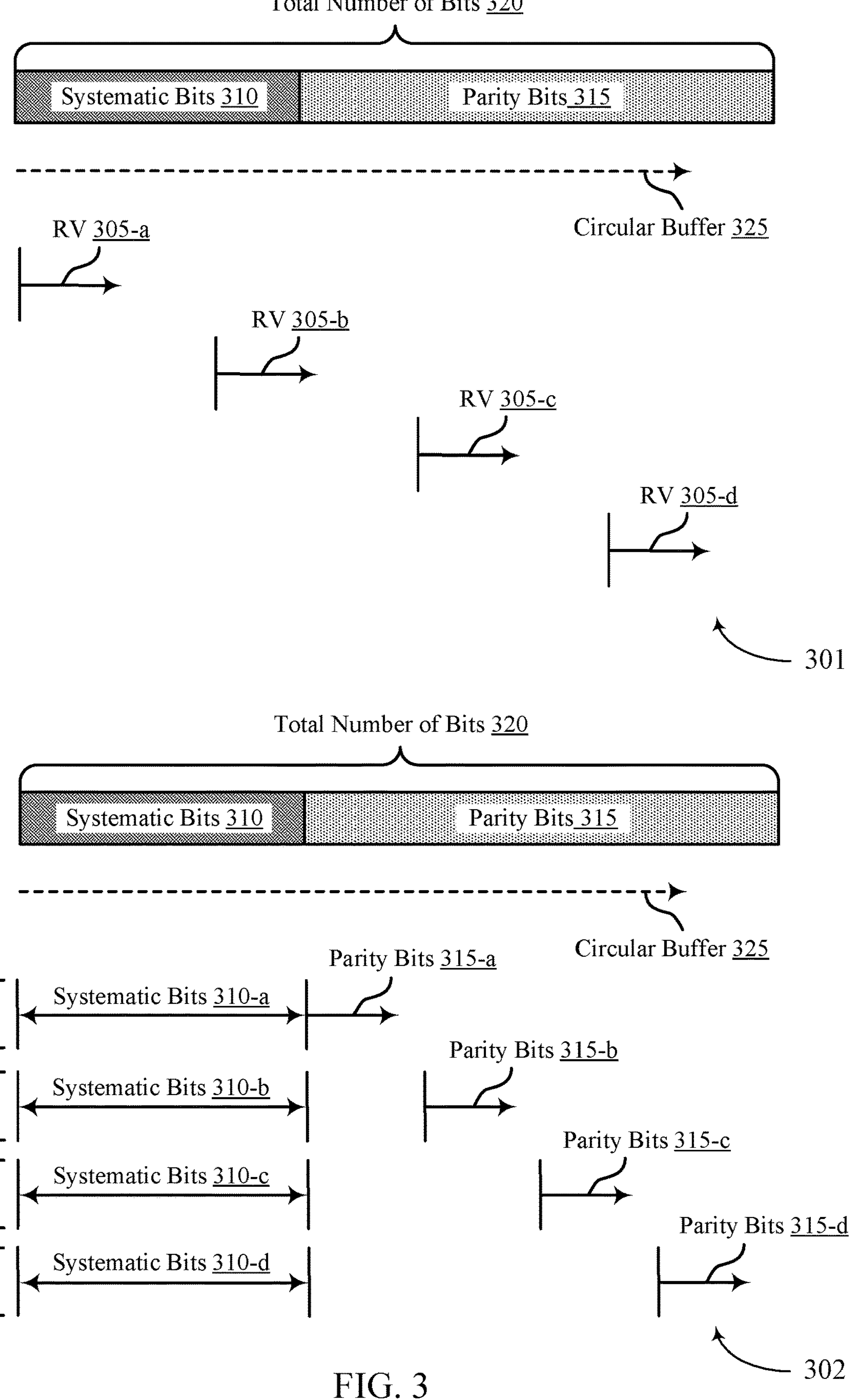
FIG. 3 illustrates an example of a redundancy version (RV) configuration in accordance with aspects of the present disclosure.

FIG. 3 illustrates an example of a RV configurations 301 and 302 that supports transmit diversity for sidelink communications in unlicensed spectrum in accordance with aspects of the present disclosure. In some cases, configuration 301 may illustrate RVs 305 as defined by a wireless communications standard and configuration 302 may illustrate RVs 305 as defined by a different definition.

As described in FIG. 2, UE 115-*a* may transmit a sidelink message 215 to UE 115-*b* via a sidelink channel 205 over multiple different CCs. In some examples, each sidelink message 215 transmitted over each CC 210 may include a different RV of a TB (e.g., a packet, a set of information bits). UE 115-*a* may then generate a set of RVs by encoding a TB (e.g., a packet) and loading the encoded TB bits into a circular buffer. Each RV may correspond to a different starting location around the circulate buffer. In some examples, a wireless device (e.g., a base station 105, a UE 115, or the like) may indicate to UE 115-*a*, or UE 115-*a* may be preconfigured with, a respective starting location on a circular buffer for each the different RVs (e.g., RV0, RV1, RV2, RV3, and the like, as defined by a wireless communications standard). In some examples, the wireless device may indicate to UE 115-*a*, or UE 115-*a* may be preconfigured with, a respective starting location on the circular buffer to include in each RV of the RVs 225 differently than defined by a wireless communications standard. For example, a number of RVs 225 may be specified, and each RV 225 may include one or more systematic bits and one or more parity bits. In some cases, the parity bits included in the RVs 225 may be different from one another. RVs 305 may be examples of RVs 225 as shown in FIG. 2.

With reference to RV configuration 301, a UE 115 may perform channel coding on a TB to generate a code block that includes a total number of encoded bits 320 having a set of systematic bits 310 and a set of parity bits 315. Channel coding may assist in data error correction. In some cases, systematic bits 310 and parity bits 315 may follow a mother code rate, which may be the relative output of systematic bits 310 compared to the output of parity bits 315. For example, the mother code rate may be one-third code rate (⅓) and the UE 115 may output two parity bits 315 for every systematic bit 310. In some other examples, the mother code rate may be a ⅓ or one-fifth (⅕) coding rate. In some cases, the UE 115 may perform a rate matching procedure, and the UE 115 may select systematic bits 310 and parity bits 315 from the channel coding output to match a coding rate used for a transmission, which may be different from the mother code rate. For examples, each different RV may have a different starting location in a circular buffer in rate matching. In some examples, the UE 115 may select systematic bits 310 and parity bits 315 starting from a location, which may be based on an RV 305 used for the transmission. For example, the UE 115 may determine to use RV 305-*a* for transmission across a given channel (e.g., CC). The UE 115 may select from systematic bits 310 and parity bits 315 starting from the location indicated by RV 305-*a*, which may be a start of the channel coding output.

In some examples, a number of parity bits 315 included in a transmission from a UE 115 may depend on a coding rate used for the transmission. For example, if the coding rate used for the transmission is the same as a mother code rate, the UE 115 may select systematic bits 310 and parity bits 315 (e.g., all of systematic bits 310 and all of parity bits 315) for transmission. In some other examples, if the coding rate used for the transmission is higher than the mother code rate, the UE 115 may not select or may drop one or more parity bits 315 (e.g., the UE 115 may not select or may drop parity bits 315 located at the end of a channel coding output). In some other examples, if the coding rate used for the transmission is lower than the mother code rate, the UE 115 may not be able to select enough bits for the transmission and may use a circular buffer 325 to repeat the selection process and select bits for the transmission.

However, different RVs 305 may include different levels of self-decodability. For example, in 301, RV 305-*a* (e.g., RV0) may be more self-decodable than other RVs 305 since RV 305-*a* may include more systematic bits 310 (e.g., all the systematic bits 310) compared to other RVs 305. Thus, a receiving UE 115 experiencing a high interference level that misses a sidelink message including RV 305-*a* (e.g., RV0) on a particular CC may largely affect decoding performance. In some other cases, the receiving UE 115 may be able to achieve full coding gain if multiple or all of the RVs are received and is able to combine the RVs when decoding.

With reference to RV configuration 302, the UE 115-*a* may performing channel coding on a TB to generate a code block that includes a total number of encoded bits 320 having a set of systematic bits 310 and a set of parity bits 315. Each RV 305 in RV configuration 302 may include systematic bits 310 and different sets of parity bits 315. Each RV 305 in RV configuration 302 may be equally self-decodable across RVs 305 due to each the RVs 305 including common (e.g., the same) systematic bits 310. In some examples, parity bits 315 included in RVs 305 may include different starting locations, and a transmitting UE 115 may select parity bits 315 at the different starting locations for transmissions over CCs. When performing combination decoding at the receiving UE 115-*b*, coding gain may be, in cases, may be lower than the coding gain of RV configuration 301 as RV configuration 302 may be comparable to chase combining, instead of incremental redundancy.

In some examples, the number of parity bits 315 included in a transmission may depend on a coding rate for the transmission. Thus, a receiving UE 115 experiencing high levels of interference when attempting to receive the transmission including an RV 305 over the CC may be able to decode other transmissions including other similarly self-decodable RVs 305 over other CCs. However, the receiving UE 115 may achieve a limited coding gain when decoding a combination of transmissions over multiple CCs (e.g., using a chase combining method instead of an incremental redundancy method or other methods).

Figure 4:
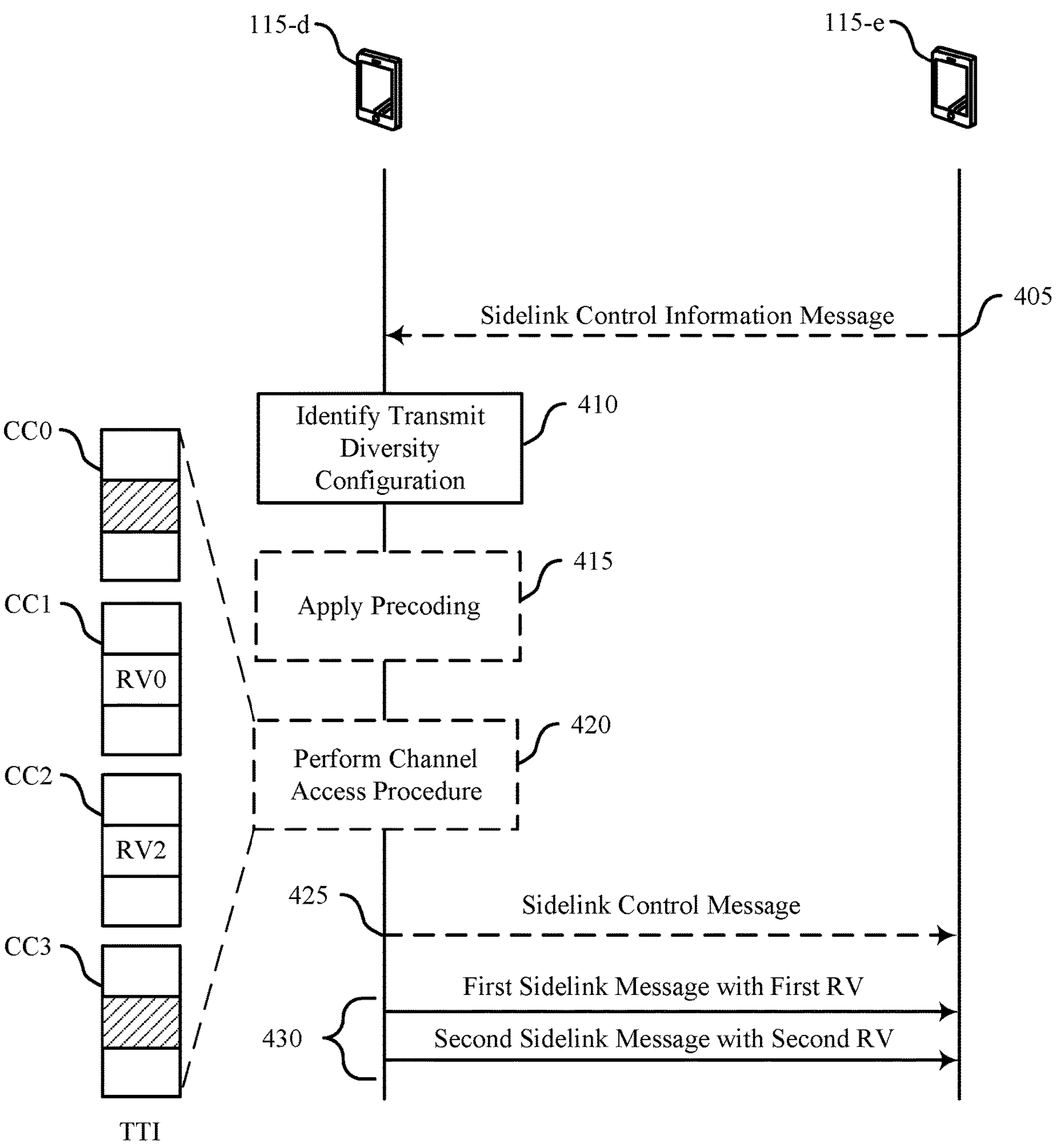
FIG. 4 illustrates an example of a process flow in accordance with aspects of the present disclosure.

FIG. 4 illustrates an example of a process flow 400 that supports transmit diversity for sidelink communications in unlicensed spectrum in accordance with aspects of the present disclosure. Process flow 400 includes UE 115-*d* and UE 115-*e*, which may be examples of a UE 115 as described herein. The process flow 400 may implement be implemented by aspects of the wireless communications systems 100 and 200 or may aspects of the wireless communications system 100 and 200 described with reference to FIGS. 1 and 2, respectively. In the following description of the process flow 400, the operations between the base station 105 and the UE 115 may be transmitted in a different order than the example order shown, or the operations performed by the UE 115-*d* and UE 115-*e* may be performed in different orders or at different times. Some operations may also be omitted from the process flow 400, and other operations may be added to the process flow 400.

In some cases, at 405, UE 115-*d* may receive a control message indicating a transmit diversity configuration to apply. The transmit diversity configuration may include an indication to transmit sidelink messages that include different RVs of a TB, apply different precoding matrices to sidelink messages, or both. The use of a transmit diversity configuration may increase likelihood of packets reception and decrease number of data retransmissions due to interference or other communications disruptions. In the case of a transmit diversity configuration indicating to use different RVs, a UE 115 may determine to transmit and receive different RVs of a same TB or data packet on different CCs. The sidelink control information message may indicate a first CC and a second CC of two or more CCs.

At 410, UE 115-*d* may identify a transmit diversity configuration that may indicate a set of CCs available for sidelink communication within a shared radio frequency spectrum band. In some cases, the transmit diversity configuration may be based on receiving sidelink control information at 405. In some cases, UE 115-*d* may be preconfigured with the transmit diversity configuration, and may or may not receive a control message at 405 indicating a transmit diversity configuration. In some examples, UE 115-*d* may identify the transmit diversity configuration based on an index of the first CC and an index of the second CC. For example, the index of the first CC imply which RV the UE 115-*d* is to transmit on the first CC and the index of the first CC imply which RV the UE 115-*d* is to transmit on the second CC.

In some cases, at 415, UE 115-*d* may apply a precoding to the first and second sidelink messages. UE 115-*d* may apply a first precoding matrix to the first sidelink message, and a second precoding matrix to the second sidelink message. In some cases, UE 115-*d* may transmit the first sidelink message having the first RV of the TB on the first CC according to a first precoding matrix and the second sidelink message having the second RV of the TB on the second CC according to a second precoding matrix. In some cases, at 430, UE 115-*d* may transmit the first sidelink message on the first CC and the second CC according to a first precoding matrix and the second sidelink message on the first CC and the second CC according to a second precoding matrix.

At 420, UE 115-*d* may perform a channel access procedure, such as a CCA, on each CC of the set of CCs, where the first CC and the second CC may be selected based on the channel access procedure. In some cases, multi-CC transmission may be conditioned on performing a channel access procedure (e.g., an LBT procedure). In some cases, multiple CCs may be configured for transmission of a same TB. UE 115-*d* may transmit in parallel in more than one CC if UE 115-*d* can succeed channel access in the more than one of the CCs. When UE 115-*d* transmits in more than one CC, different RVs may be used for transmission in different CCs. For example, the UE 115-*d* may transmit based on a (pre) configured or pre-determined RV order, e.g., RV0-RV2-RV3-RV1. In an example, if UE 115-*d* transmits in one CC, it uses RV0; if UE 115-*d* transmits simultaneously or concurrently in two CCs, it uses RV0 and RV2; if UE 115-*d* transmits simultaneously or concurrently in three CCs, it uses RV0, RV2 and RV3, and so forth.

In an example, the UE 115-*d* performs channel access (LBT) in the multiple CCs separately (e.g., CC0, CC1, CC2, and CC3) prior to transmission (e.g., each CC has an LBT procedure running). UE 115-*d* may transmit in the one or more CCs that have successful channel access (e.g., the UE 115-*d* determines that an LBT outcome is an idle CC for one or more the CCs). In an example, UE 115-*d* may determine that CC0 and CC3 are busy, and that CC1 and CC2 are idle. The UE 115-*d* may transmit a first sidelink message with RV0 of a TB on CC1 and a second sidelink message with RV1 of the TB on CC2

In some cases, sidelink control information received at 405 may also indicate that a third sidelink message and a fourth sidelink message respectively transport a third RV and a fourth RV of a second TB. UE 115-*d* may decode the second TB based on monitoring a third CC for the third sidelink message, monitoring a fourth CC for the fourth sidelink message, or both.

In some cases, at 425, UE 115-*d* may transmit a sidelink control message (e.g., SCI) indicating that the first CC and the second CC respectively transport the first RV and the second RV of the TB. In some cases, UE 115-*d* may transmit, via the first CC, a first sidelink control message including an indication that the first sidelink message includes the first RV of the TB. UE 115-*d* may transmit via the second CC, a second sidelink control message including an indication that the second sidelink message is the second RV of the TB. In some cases, UE 115-*d* may indicate a multi-CC transmission to the UE 115-*e*. For example, UE 115-*d* may include one or more parameters in SCI indicating multiple CCs have a concurrent transmission of a TB. In an example, the UE 115-*d* may transmit the same TB in four CCs. In each of the four transmissions, UE 115-*d* transmit a sidelink control message on each of the four CC indicating the UE 115-*d* is concurrently transmitting the same TB on the other three CC. The receiving UE 115-*e*, if it can decode SCI from one of the four CCs, may detect the multi-CC transmission and perform combination decoding.

At 430, UE 115-*d* may transmit, based on the transmit diversity configuration, a first sidelink message having a first RV of a TB, and a second sidelink message having a second RV of the TB. UE 115-*d* may transmit the first and second sidelink messages on a first CC and a second CC of the set of CCs within the shared radio frequency spectrum band. The first CC and the second CC may be based on the SCI message received at 405. In some cases, UE 115-*d* may transmit the first sidelink message on the first CC, and transmit the second sidelink message of the second CC.

In some cases, UE 115-*d* may transmit the first sidelink message having the first RV of the RB and the second sidelink message having the second RV of the TB that differs from the first RV. The first sidelink message may include a data packet, a set of information bits, or a TB.

In some cases, UE 115-*d* may transmit the first sidelink message that includes first bits of a code block generated based on the TB. UE 115-*d* may transmit the second sidelink message that includes second bits of the code block that differ from the first bits. The first bits may include one or more first systematic bits of the code block and the second bits may include one or more second systematic bits of the code block that differ from the one or more first systematic bits of the code block. In some cases, the first bits may include one or more first systematic bits of the code block and the second bits may include one or more parity bits of the code block. The first bits may also include systematic bits of the code block and first parity bits of the code block, and the second bits may include the systematic bits of the code block and second parity bits of the code block that may differ from the first parity bits. In some cases, the transmit diversity configuration may indicate a set of RVs, where each RV of the set of RVs may correspond to a different starting location in a circular buffer.

Figure 5:
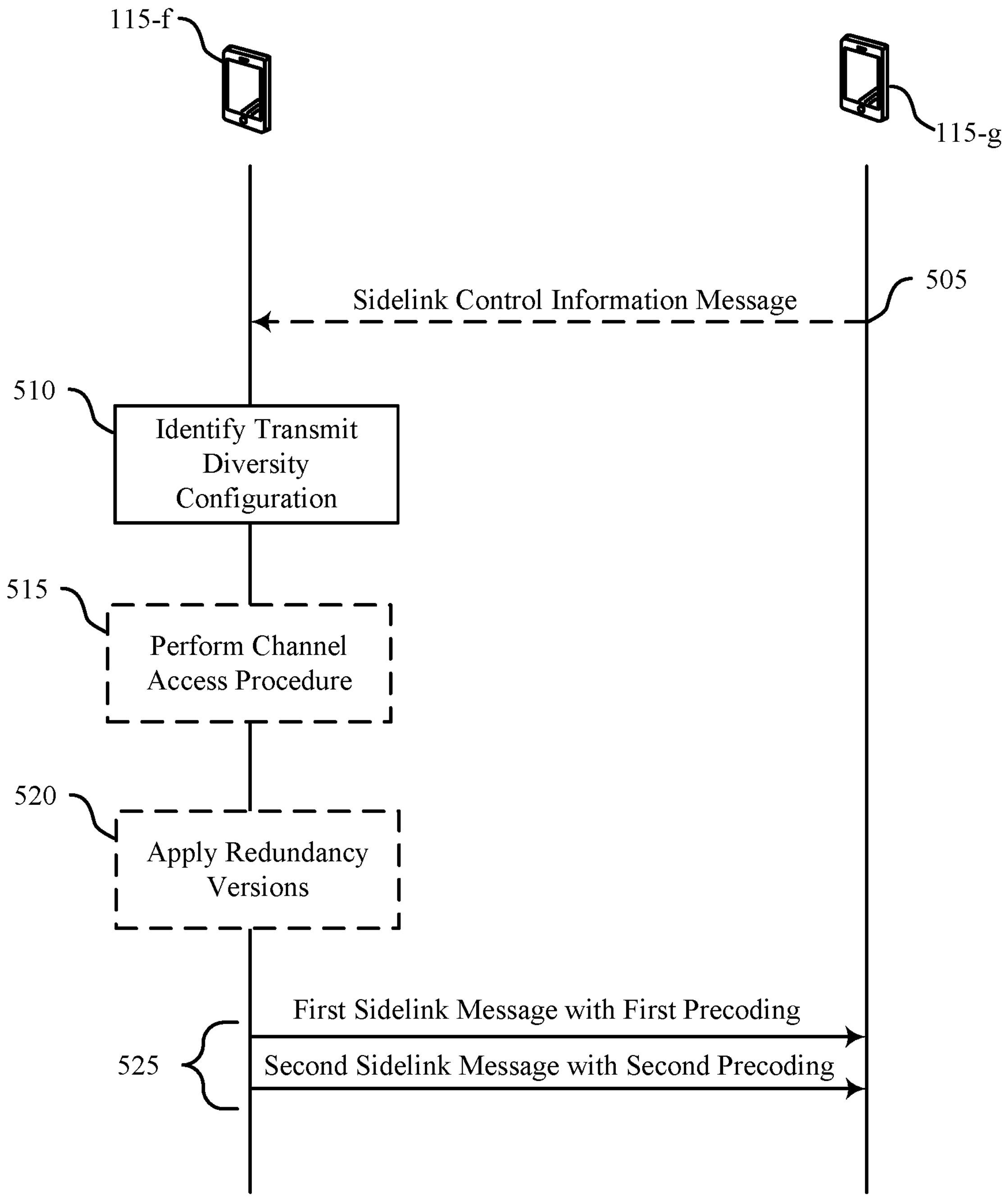
FIG. 5 illustrates an example of a process flow in accordance with aspects of the present disclosure.

FIG. 5 illustrates an example of a process flow 500 that supports transmit diversity for sidelink communications in unlicensed spectrum in accordance with aspects of the present disclosure. Process flow 500 includes UE 115-*f* and UE 115-*g*, which may be examples of a UE 115 and a base station 105 as described herein. The process flow 400 may implement be implemented by aspects of the wireless communications systems 100 and 200 or may aspects of the wireless communications system 100 and 200 described with reference to FIGS. 1 and 2, respectively. In the following description of the process flow 400, the operations between the UE 115-*f* and UE 115-*g* may be transmitted in a different order than the example order shown, or the operations performed by the base station 105 and the UE 115 may be performed in different orders or at different times. Some operations may also be omitted from the process flow 400, and other operations may be added to the process flow 400.

In some cases, at 505, UE 115-*f* may receive a control message indicating the transmit diversity configuration, the first CC, the second CC, or a combination of these. The transmit diversity configuration may include an indication to transmit different version of data on a sidelink message using different RVs, different precoding matrices, or both. The use of a transmit diversity configuration may increase likelihood of packets reception and decrease number of data retransmissions due to interference or other communications disruptions. In the case of a transmit diversity configuration indicating to use precoding matrices, a UE 115 may determine to transmit and receive different TBs or data packets on different CCs, each with precoded modulation symbols based on different precoding matrices.

At 510, UE 115-*f* may identify a transmit diversity configuration that indicates a set of CCs available for sidelink communications within a shared radio frequency spectrum band and a set of precoding matrices. For example, the UE 115-*f* may be preconfigured with the transmit diversity configuration and may, in some cases, not receive the control message indicating the transmit diversity configuration.

UE 115-*f* may generate a first set of modulation symbols for the first sidelink message and a second set of modulation symbols for the second sidelink message. UE 115-*f* may then precode the first set of modulation symbols based on the first precoding matrix to generate a first set of precoded symbols and the second set of modulation symbols based on the second precoding matrix to generate a second set of precoded symbols. UE 115-*f* may first map the first set of precoded symbols to respective subcarriers of a first set of subcarriers of the first CC. UE 115-*f* may then second map the second set of precoded symbols to respective subcarriers of a second plurality of subcarriers of the second CC, where the first sidelink message may be communicated via the first CC in accordance with the first mapping and the second sidelink message may be communicated via the second CC in accordance with the second mapping.

In some examples, UE 115-*f* may generate a first set of modulation symbols based on the first sidelink message. UE 115-*f* may precode the first set of modulation symbols to generate a first set of precoded modulation symbols based on the first precoding matrix. UE 115-*f* may map a respective precoded modulation symbol of the first set of precoded modulation symbols to at least one of the first CC or the second CC, where the first sidelink message is communicated via the first CC and the second CC based on the mapping of the first plurality of precoded modulation symbols. UE 115-*f* may generate a second set of modulation symbols based on the second sidelink message. UE 115-*f* may then precode the second set of modulation symbols to generate a second set of precoded modulation symbols based on the second precoding matrix. UE 115-*f* may then map a respective precoded modulation symbol of the second set of precoded modulation symbols to at least one of the first CC or the second CC, where the second sidelink message may be communicated via the first CC and the second CC based on the mapping of the second set of precoded modulation symbols.

At 515, UE 115-*f* may perform a channel access procedure, such as a CCA on the set of CCs. UE 115-*f* may select the first CC and the second CC based on the channel access procedure, as described in FIG. 4 and herein.

At 525, UE 115-*f* may transmit, based on the transmit diversity configuration, a first sidelink message including a TB (e.g., a data packet) precoded using a first precoding matrix of the set of precoding matrices, and a second sidelink message including the TB precoded using a second precoding matrix of the set of precoding matrices on a first CC and a second CC of the set of CCs within the shared radio frequency spectrum band. In some examples, the first sidelink message including the TB may include a first RV of the TB, and the second sidelink message including the data may include a second RV of the TB.

UE 115-*f* may transmit, via the first CC, the first sidelink message precoded using the first precoding matrix that may be selected based on an index of the first CC. UE 115-*b* may transmit via the second CC, the second sidelink message precoded using the second precoding matrix that may be selected based on an index of the second CC.

In some cases, at 520, UE 115-*f* may include first and second RVs in the first and second sidelink messages. In these cases, UE 115-*f* may transmit the first sidelink message that may include a first RV of the TB and the second sidelink message that includes a second RV of the TB. UE 115-*f* may also transmit the first sidelink message that may be precoded using the first precoding matrix, which may generate a first two-antenna single layer transmission. UE 115-*f* may transmit the second sidelink message that may be precoded using the second precoding matrix to generate a second two-antenna single layer transmission.

UE 115-*e* may transmit the first sidelink message precoded using the first precoding matric that may be randomly selected from the set of precoding matrices. UE 115-*f* may transmit the second sidelink message precoded using the second precoding matrix that may be randomly selected from the set of precoding matrices. UE 115-*f* may transmit the first sidelink message using a first antenna port of UE 115-*f*, and may transmit the second sidelink message using a second antenna port of UE 115-*f*.

FIG. 6 shows a block diagram 600 of a device 605 that supports transmit diversity for sidelink communications in unlicensed spectrum in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to transmit diversity for sidelink communications in unlicensed spectrum). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to transmit diversity for sidelink communications in unlicensed spectrum). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of transmit diversity for sidelink communications in unlicensed spectrum as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for identifying a transmit diversity configuration that indicates a set of multiple CCs available for sidelink communication within a shared radio frequency spectrum band. The communications manager 620 may be configured as or otherwise support a means for transmitting, based on the transmit diversity configuration, a first sidelink message having a first RV of a TB and a second sidelink message having a second RV of the TB on a first CC and a second CC of the set of multiple CCs within the shared radio frequency spectrum band.

Additionally or alternatively, the communications manager 620 may support wireless communications at a UE in accordance with examples as disclosed herein. For example, the communications manager 620 may be configured as or otherwise support a means for identifying a transmit diversity configuration that indicates a set of multiple CCs available for sidelink communications within a shared radio frequency spectrum band and a set of multiple precoding matrices. The communications manager 620 may be configured as or otherwise support a means for transmitting, based on the transmit diversity configuration, a first sidelink message including a TB precoded using a first precoding matrix of the set of multiple precoding matrices and a second sidelink message including the TB precoded using a second precoding matrix of the set of multiple precoding matrices on a first CC and a second CC of the set of multiple CCs within the shared radio frequency spectrum band.

Figure 7:
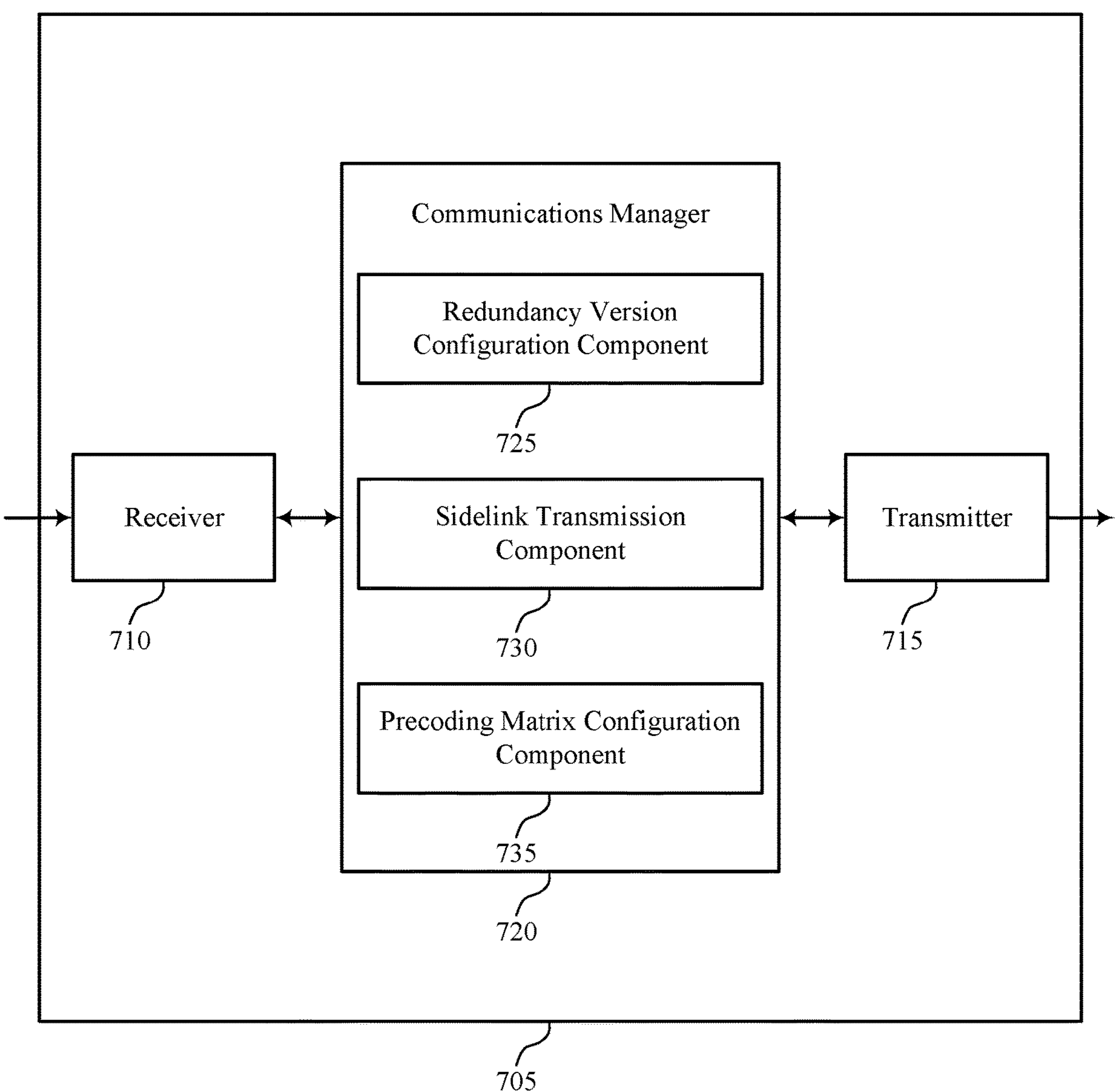

By including or configuring the communications manager 620 in accordance with examples as described herein, the device 605 (e.g., a processor controlling or otherwise coupled to the receiver 610, the transmitter 615, the communications manager 620, or a combination thereof) may support techniques for increased transmit diversity configuration, which may improve communications efficiency FIG. 7 shows a block diagram 700 of a device 705 that supports transmit diversity for sidelink communications in unlicensed spectrum in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to transmit diversity for sidelink communications in unlicensed spectrum). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to transmit diversity for sidelink communications in unlicensed spectrum). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of transmit diversity for sidelink communications in unlicensed spectrum as described herein. For example, the communications manager 720 may include a RV configuration component 725, a sidelink transmission component 730, a precoding matrix configuration component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The RV configuration component 725 may be configured as or otherwise support a means for identifying a transmit diversity configuration that indicates a set of multiple CCs available for sidelink communication within a shared radio frequency spectrum band. The sidelink transmission component 730 may be configured as or otherwise support a means for transmitting, based on the transmit diversity configuration, a first sidelink message having a first RV of a TB and a second sidelink message having a second RV of the TB on a first CC and a second CC of the set of multiple CCs within the shared radio frequency spectrum band.

Additionally or alternatively, the communications manager 720 may support wireless communications at a UE in accordance with examples as disclosed herein. The precoding matrix configuration component 735 may be configured as or otherwise support a means for identifying a transmit diversity configuration that indicates a set of multiple CCs available for sidelink communications within a shared radio frequency spectrum band and a set of multiple precoding matrices. The sidelink transmission component 730 may be configured as or otherwise support a means for transmitting, based on the transmit diversity configuration, a first sidelink message including a TB precoded using a first precoding matrix of the set of multiple precoding matrices and a second sidelink message including the TB precoded using a second precoding matrix of the set of multiple precoding matrices on a first CC and a second CC of the set of multiple CCs within the shared radio frequency spectrum band.

Figure 8:
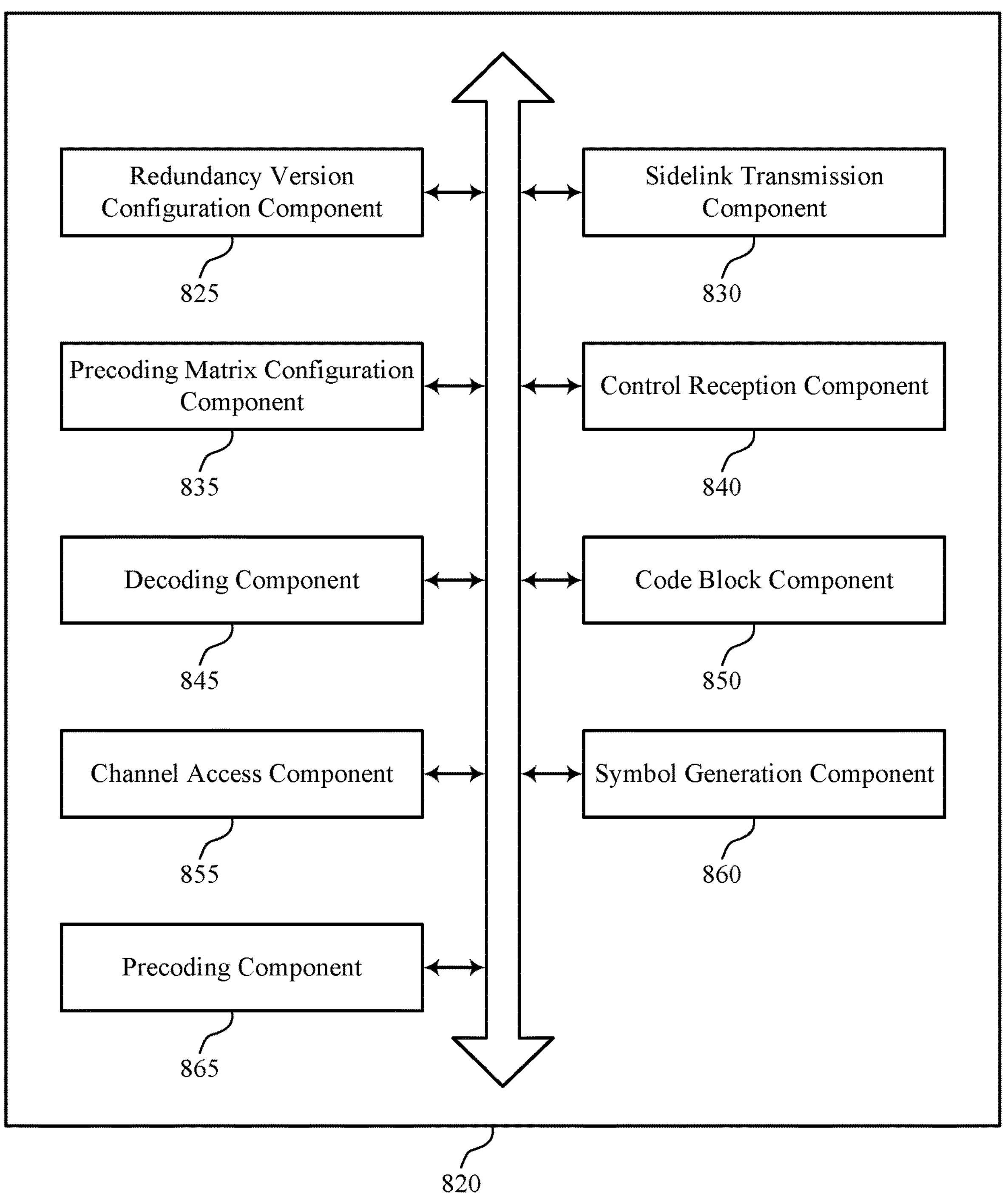
FIG. 8 shows a block diagram of a communications manager in unlicensed spectrum in accordance with aspects of the present disclosure.

FIG. 8 shows a block diagram 800 of a communications manager 820 that supports transmit diversity for sidelink communications in unlicensed spectrum in accordance with aspects of the present disclosure. The communications manager 820 may be an example of aspects of a communications manager 620, a communications manager 720, or both, as described herein. The communications manager 820, or various components thereof, may be an example of means for performing various aspects of transmit diversity for sidelink communications in unlicensed spectrum as described herein. For example, the communications manager 820 may include a RV configuration component 825, a sidelink transmission component 830, a precoding matrix configuration component 835, a control reception component 840, a decoding component 845, a code block component 850, a channel access component 855, a symbol generation component 860, a precoding component 865, or any combination thereof. Each of these components may communicate, directly or indirectly, with one another (e.g., via one or more buses).

The communications manager 820 may support wireless communications at a UE in accordance with examples as disclosed herein. The RV configuration component 825 may be configured as or otherwise support a means for identifying a transmit diversity configuration that indicates a set of multiple CCs available for sidelink communication within a shared radio frequency spectrum band. The sidelink transmission component 830 may be configured as or otherwise support a means for transmitting, based on the transmit diversity configuration, a first sidelink message having a first RV of a TB and a second sidelink message having a second RV of the TB on a first CC and a second CC of the set of multiple CCs within the shared radio frequency spectrum band.

In some examples, to support identifying the transmit diversity configuration, the control reception component 840 may be configured as or otherwise support a means for receiving a control message indicating the transmit diversity configuration.

In some examples, the control reception component 840 may be configured as or otherwise support a means for receiving a sidelink control information message indicating the first CC and the second CC.

In some examples, to support transmitting, the sidelink transmission component 830 may be configured as or otherwise support a means for transmitting the first sidelink message on the first CC. In some examples, to support transmitting, the sidelink transmission component 830 may be configured as or otherwise support a means for transmitting the second sidelink message on the second CC.

In some examples, the control reception component 840 may be configured as or otherwise support a means for receiving a sidelink control information message indicating that a third sidelink message and a fourth sidelink message respectively transport a third RV and a fourth RV of a second TB. In some examples, the decoding component 845 may be configured as or otherwise support a means for decoding the second TB based on monitoring a third CC for the third sidelink message, monitoring a fourth CC for the fourth sidelink message, or both.

In some examples, the sidelink transmission component 830 may be configured as or otherwise support a means for transmitting a sidelink control message indicating that the first CC and the second CC respectively transport the first RV and the second RV of the TB.

In some examples, to support transmitting, the sidelink transmission component 830 may be configured as or otherwise support a means for transmitting the first sidelink message having the first RV of the TB and the second sidelink message having the second RV of the TB that differs from the first RV.

In some examples, to support transmitting, the sidelink transmission component 830 may be configured as or otherwise support a means for transmitting the first sidelink message having the first RV of the TB on the first CC according to a first precoding matrix and the second sidelink message having the second RV of the TB on the second CC according to a second precoding matrix.

In some examples, to support transmitting, the sidelink transmission component 830 may be configured as or otherwise support a means for transmitting the first sidelink message on the first CC and the second CC according to a first precoding matrix and the second sidelink message on the first CC and the second CC according to a second precoding matrix.

In some examples, to support transmitting, the code block component 850 may be configured as or otherwise support a means for transmitting the first sidelink message that includes first bits of a code block generated based on the TB. In some examples, to support transmitting, the code block component 850 may be configured as or otherwise support a means for transmitting the second sidelink message that includes second bits of the code block that differ from the first bits.

In some examples, the first bits include one or more first systematic bits of the code block and the second bits include one or more second systematic bits of the code block that differ from the one or more first systematic bits of the code block.

In some examples, the first bits include one or more first systematic bits of the code block and the second bits include one or more parity bits of the code block.

In some examples, the first bits include systematic bits of the code block and first parity bits of the code block and the second bits include the systematic bits of the code block and second parity bits of the code block that differ from the first parity bits.

In some examples, the transmit diversity configuration indicates a set of multiple RVs. In some examples, each RV of the set of multiple RVs corresponds to a different starting location in a circular buffer.

In some examples, the sidelink transmission component 830 may be configured as or otherwise support a means for transmitting, via the first CC, a first sidelink control message including an indication that the first sidelink message is the first RV of the TB. In some examples, the sidelink transmission component 830 may be configured as or otherwise support a means for transmitting, via the second CC, a second sidelink control message including an indication that the second sidelink message is the second RV of the TB.

In some examples, the RV configuration component 825 may be configured as or otherwise support a means for identifying the transmit diversity configuration based on an index of the first CC and an index of the second CC.

In some examples, the channel access component 855 may be configured as or otherwise support a means for performing a channel access procedure on each CC of the set of multiple CCs, where the first CC and the second CC are selected based on the channel access procedure.

Additionally or alternatively, the communications manager 820 may support wireless communications at a UE in accordance with examples as disclosed herein. The precoding matrix configuration component 835 may be configured as or otherwise support a means for identifying a transmit diversity configuration that indicates a set of multiple CCs available for sidelink communications within a shared radio frequency spectrum band and a set of multiple precoding matrices. In some examples, the sidelink transmission component 830 may be configured as or otherwise support a means for transmitting, based on the transmit diversity configuration, a first sidelink message including a TB precoded using a first precoding matrix of the set of multiple precoding matrices and a second sidelink message including the TB precoded using a second precoding matrix of the set of multiple precoding matrices on a first CC and a second CC of the set of multiple CCs within the shared radio frequency spectrum band.

In some examples, to support transmitting, the sidelink transmission component 830 may be configured as or otherwise support a means for transmitting, via the first CC, the first sidelink message precoded using the first precoding matrix that is selected based on an index of the first CC. In some examples, to support transmitting, the sidelink transmission component 830 may be configured as or otherwise support a means for transmitting, via the second CC, the second sidelink message precoded using the second precoding matrix that is selected based on an index of the second CC.

In some examples, the control reception component 840 may be configured as or otherwise support a means for receiving a control message indicating the transmit diversity configuration, the first CC, the second CC, or any combination thereof.

In some examples, to support transmitting, the sidelink transmission component 830 may be configured as or otherwise support a means for transmitting the first sidelink message that includes a first RV of the TB and the second sidelink message that includes a second RV of the TB.

In some examples, to support transmitting, the sidelink transmission component 830 may be configured as or otherwise support a means for transmitting the first sidelink message that is precoded using the first precoding matrix to generate a first two-antenna single layer transmission. In some examples, to support transmitting, the sidelink transmission component 830 may be configured as or otherwise support a means for transmitting the second sidelink message that is precoded using the second precoding matrix to generate a second two-antenna single layer transmission.

In some examples, the sidelink transmission component 830 may be configured as or otherwise support a means for transmitting the first sidelink message using a first antenna port of the UE. In some examples, the sidelink transmission component 830 may be configured as or otherwise support a means for transmitting the second sidelink message using a second antenna port of the UE.

In some examples, the symbol generation component 860 may be configured as or otherwise support a means for generating a first set of multiple modulation symbols for the first sidelink message and a second set of multiple modulation symbols for the second sidelink message. In some examples, the precoding component 865 may be configured as or otherwise support a means for precoding the first set of multiple modulation symbols based on the first precoding matrix to generate a first set of multiple precoded symbols and the second set of multiple modulation symbols based on the second precoding matrix to generate a second set of multiple precoded symbols. In some examples, the precoding component 865 may be configured as or otherwise support a means for first mapping the first set of multiple precoded symbols to respective subcarriers of a first set of multiple subcarriers of the first CC. In some examples, the precoding component 865 may be configured as or otherwise support a means for second mapping the second set of multiple precoded symbols to respective subcarriers of a second set of multiple subcarriers of the second CC, where the first sidelink message is communicated via the first CC in accordance with the first mapping and the second sidelink message is communicated via the second CC in accordance with the second mapping.

In some examples, to support transmitting, the sidelink transmission component 830 may be configured as or otherwise support a means for transmitting the first sidelink message precoded using the first precoding matrix that is randomly selected from the set of multiple precoding matrices. In some examples, to support transmitting, the sidelink transmission component 830 may be configured as or otherwise support a means for transmitting the second sidelink message precoded using the second precoding matrix that is randomly selected from the set of multiple precoding matrices.

In some examples, the channel access component 855 may be configured as or otherwise support a means for performing a channel access procedure on the set of multiple CCs. In some examples, the channel access component 855 may be configured as or otherwise support a means for selecting the first CC and the second CC based on the channel access procedure.

In some examples, the symbol generation component 860 may be configured as or otherwise support a means for generating a first set of multiple modulation symbols based on the first sidelink message. In some examples, the precoding component 865 may be configured as or otherwise support a means for precoding the first set of multiple modulation symbols to generate a first set of multiple precoded modulation symbols based on the first precoding matrix. In some examples, the precoding component 865 may be configured as or otherwise support a means for mapping a respective precoded modulation symbol of the first set of multiple precoded modulation symbols to at least one of the first CC or the second CC, where the first sidelink message is communicated via the first CC and the second CC based on the mapping of the first set of multiple precoded modulation symbols.

In some examples, the symbol generation component 860 may be configured as or otherwise support a means for generating a second set of multiple modulation symbols based on the second sidelink message. In some examples, the precoding component 865 may be configured as or otherwise support a means for precoding the second set of multiple modulation symbols to generate a second set of multiple precoded modulation symbols based on the second precoding matrix. In some examples, the precoding component 865 may be configured as or otherwise support a means for mapping a respective precoded modulation symbol of the second set of multiple precoded modulation symbols to at least one of the first CC or the second CC, where the second sidelink message is communicated via the first CC and the second CC based on the mapping of the second set of multiple precoded modulation symbols.

Figure 9:
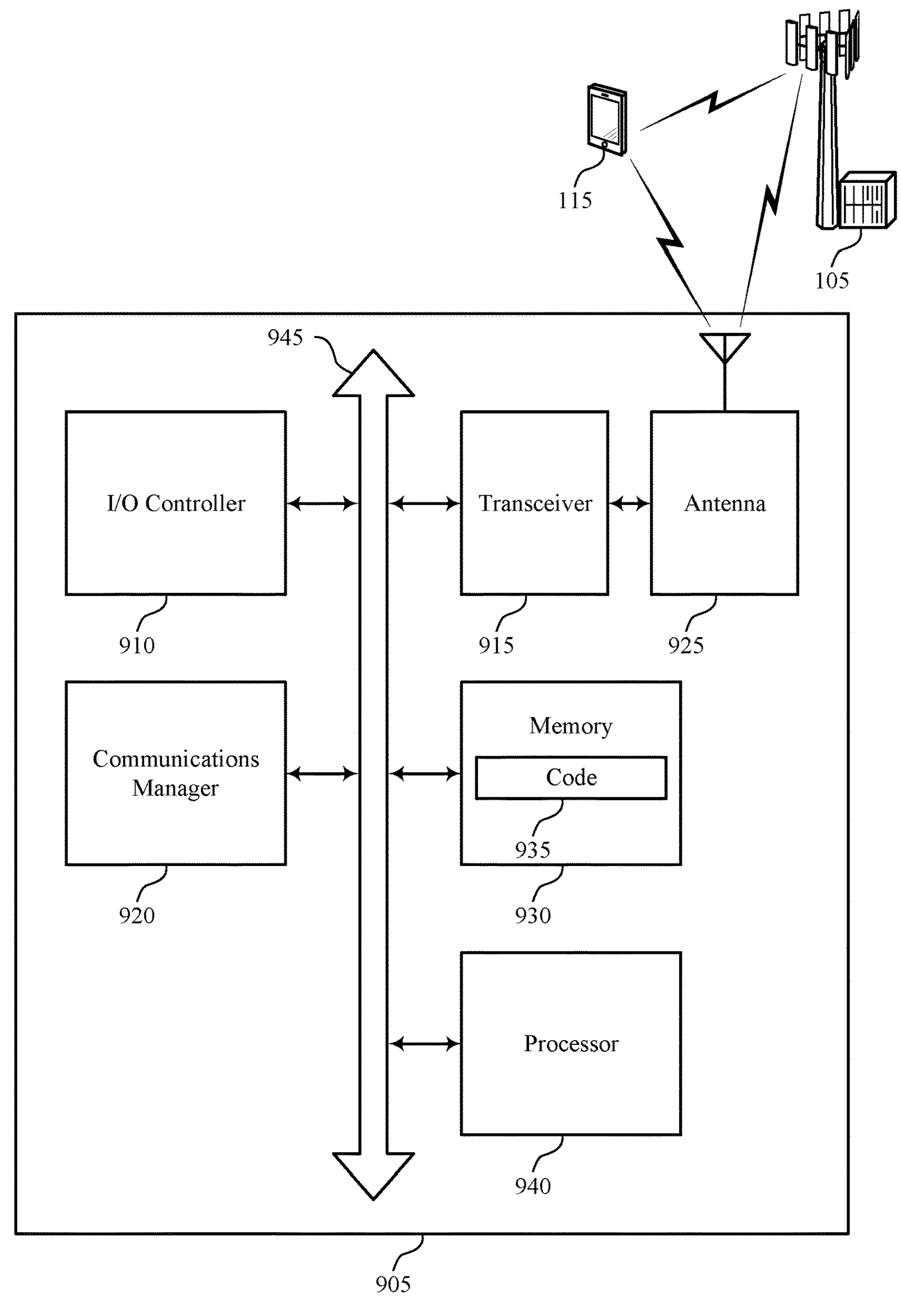
FIG. 9 shows a diagram of a system including a device in accordance with aspects of the present disclosure.

FIG. 9 shows a diagram of a system 900 including a device 905 that supports transmit diversity for sidelink communications in unlicensed spectrum in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting transmit diversity for sidelink communications in unlicensed spectrum). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for identifying a transmit diversity configuration that indicates a set of multiple CCs available for sidelink communication within a shared radio frequency spectrum band. The communications manager 920 may be configured as or otherwise support a means for transmitting, based on the transmit diversity configuration, a first sidelink message having a first RV of a TB and a second sidelink message having a second RV of the TB on a first CC and a second CC of the set of multiple CCs within the shared radio frequency spectrum band.

Additionally or alternatively, the communications manager 920 may support wireless communications at a UE in accordance with examples as disclosed herein. For example, the communications manager 920 may be configured as or otherwise support a means for identifying a transmit diversity configuration that indicates a set of multiple CCs available for sidelink communications within a shared radio frequency spectrum band and a set of multiple precoding matrices. The communications manager 920 may be configured as or otherwise support a means for transmitting, based on the transmit diversity configuration, a first sidelink message including a TB precoded using a first precoding matrix of the set of multiple precoding matrices and a second sidelink message including the TB precoded using a second precoding matrix of the set of multiple precoding matrices on a first CC and a second CC of the set of multiple CCs within the shared radio frequency spectrum band.

By including or configuring the communications manager 920 in accordance with examples as described herein, the device 905 may support techniques for improved communications efficiency by increasing transmit diversity in sidelink messages. The transmit diversity may be based on a preconfiguration or based on signaling.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of transmit diversity for sidelink communications in unlicensed spectrum as described herein, or the processor 940 and the memory 930 may be otherwise configured to perform or support such operations.

Figure 10:
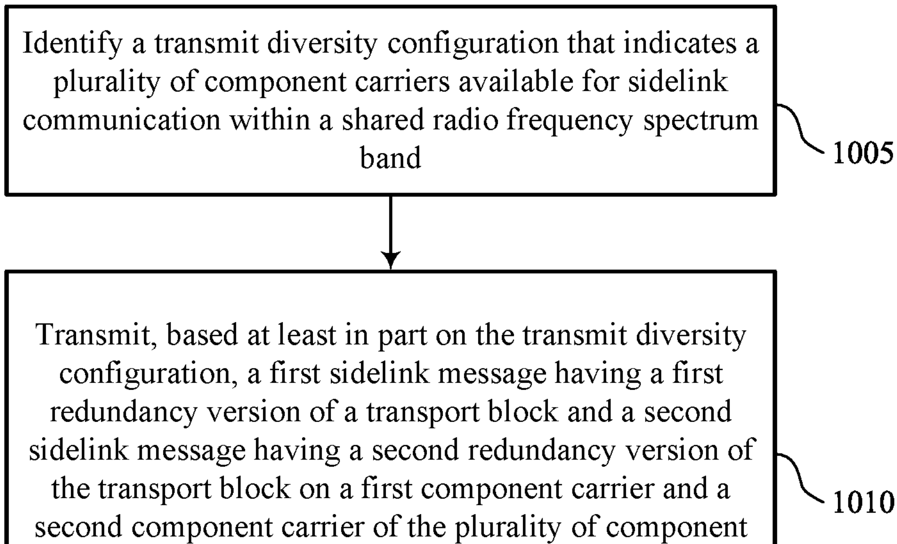

FIG. 10 shows a flowchart illustrating a method 1000 that supports transmit diversity for sidelink communications in unlicensed spectrum in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include identifying a transmit diversity configuration that indicates a set of multiple CCs available for sidelink communication within a shared radio frequency spectrum band. The operations of 1005 may be performed in accordance with examples as disclosed herein. In some examples, aspects of the operations of 1005 may be performed by a RV configuration component 825 as described with reference to FIG. 8.

At 1010, the method may include transmitting, based on the transmit diversity configuration, a first sidelink message having a first RV of a TB and a second sidelink message having a second RV of the TB on a first CC and a second CC of the set of multiple CCs within the shared radio frequency spectrum band. The operations of 1010 may be performed in accordance with examples as disclosed herein. In some examples, aspects of the operations of 1010 may be performed by a sidelink transmission component 830 as described with reference to FIG. 8.

Figure 11:
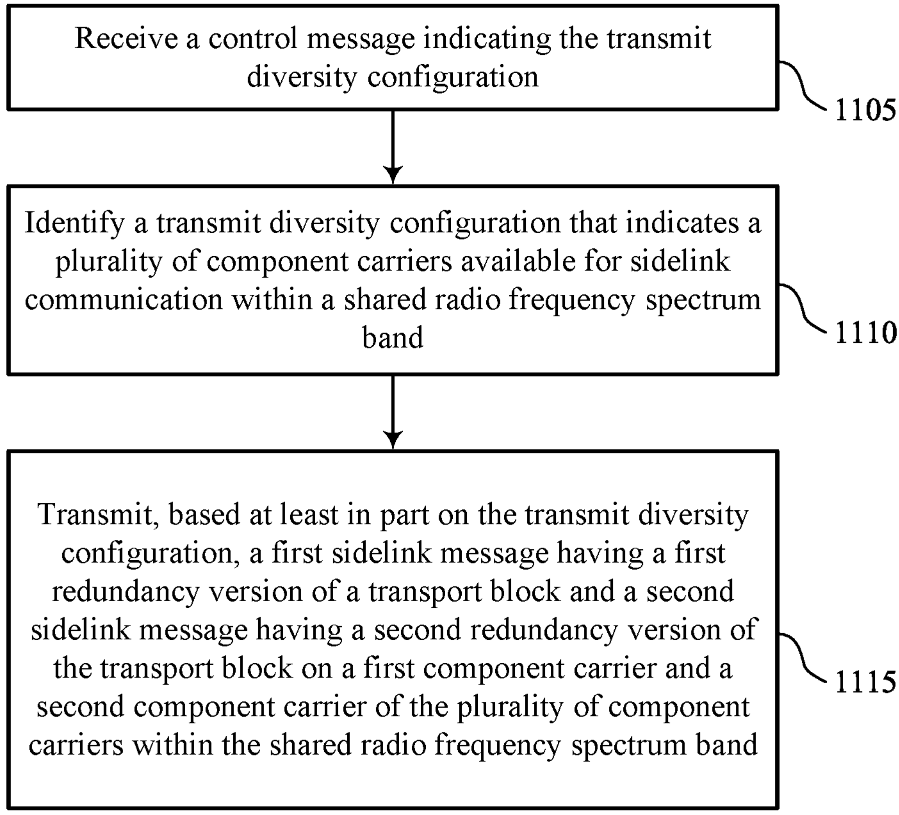

FIG. 11 shows a flowchart illustrating a method 1100 that supports transmit diversity for sidelink communications in unlicensed spectrum in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving a control message indicating the transmit diversity configuration. The operations of 1105 may be performed in accordance with examples as disclosed herein. In some examples, aspects of the operations of 1105 may be performed by a control reception component 840 as described with reference to FIG. 8.

At 1110, the method may include identifying a transmit diversity configuration that indicates a set of multiple CCs available for sidelink communication within a shared radio frequency spectrum band. The operations of 1110 may be performed in accordance with examples as disclosed herein. In some examples, aspects of the operations of 1110 may be performed by a RV configuration component 825 as described with reference to FIG. 8.

At 1115, the method may include transmitting, based on the transmit diversity configuration, a first sidelink message having a first RV of a TB and a second sidelink message having a second RV of the TB on a first CC and a second CC of the set of multiple CCs within the shared radio frequency spectrum band. The operations of 1115 may be performed in accordance with examples as disclosed herein. In some examples, aspects of the operations of 1115 may be performed by a sidelink transmission component 830 as described with reference to FIG. 8.

FIG. 12 shows a flowchart illustrating a method 1200 that supports transmit diversity for sidelink communications in unlicensed spectrum in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include identifying a transmit diversity configuration that indicates a set of multiple CCs available for sidelink communications within a shared radio frequency spectrum band and a set of multiple precoding matrices. The operations of 1205 may be performed in accordance with examples as disclosed herein. In some examples, aspects of the operations of 1205 may be performed by a precoding matrix configuration component 835 as described with reference to FIG. 8.

At 1210, the method may include transmitting, based on the transmit diversity configuration, a first sidelink message including a TB precoded using a first precoding matrix of the set of multiple precoding matrices and a second sidelink message including the TB precoded using a second precoding matrix of the set of multiple precoding matrices on a first CC and a second CC of the set of multiple CCs within the shared radio frequency spectrum band. The operations of 1210 may be performed in accordance with examples as disclosed herein. In some examples, aspects of the operations of 1210 may be performed by a sidelink transmission component 830 as described with reference to FIG. 8.

Figure 13:
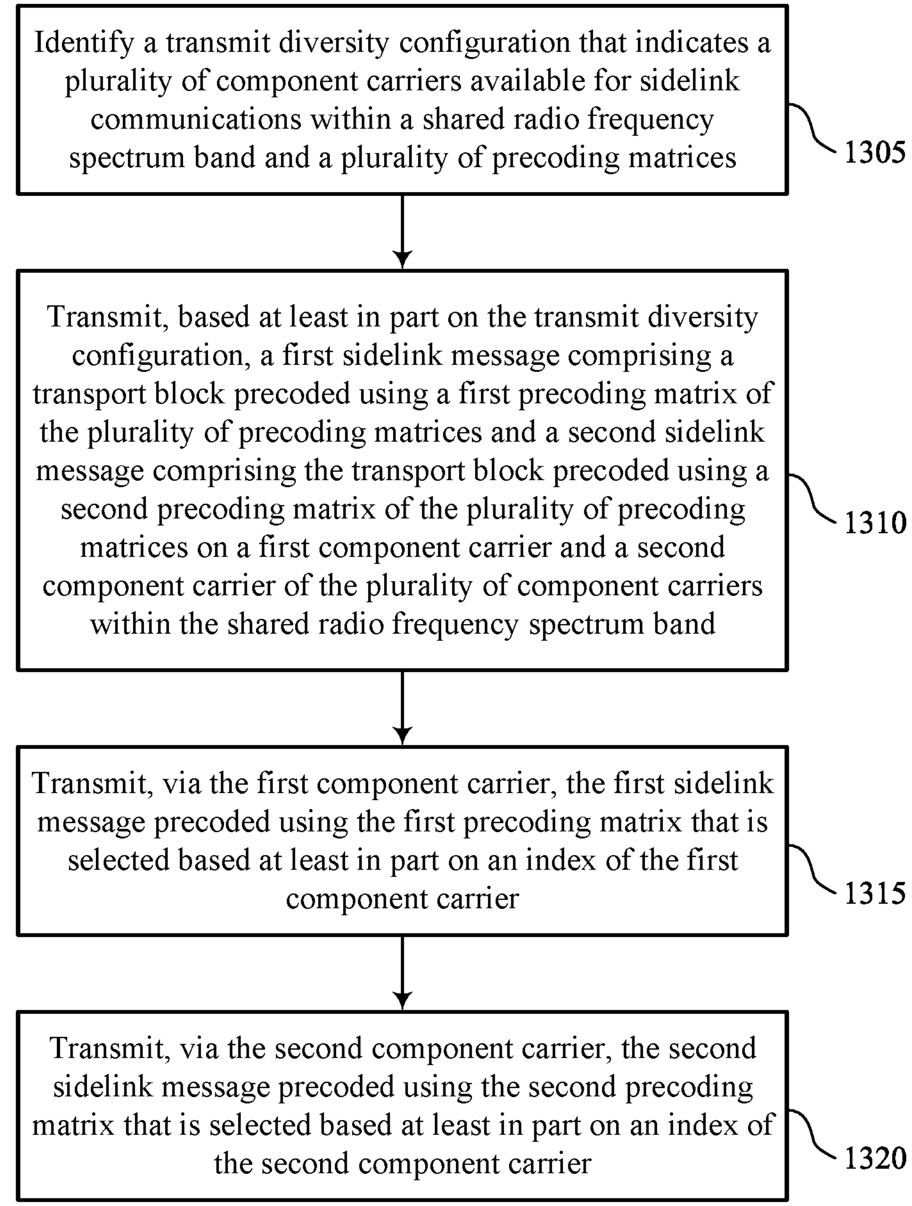

FIG. 13 shows a flowchart illustrating a method 1300 that supports transmit diversity for sidelink communications in unlicensed spectrum in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include identifying a transmit diversity configuration that indicates a set of multiple CCs available for sidelink communications within a shared radio frequency spectrum band and a set of multiple precoding matrices. The operations of 1305 may be performed in accordance with examples as disclosed herein. In some examples, aspects of the operations of 1305 may be performed by a precoding matrix configuration component 835 as described with reference to FIG. 8.

At 1310, the method may include transmitting, based on the transmit diversity configuration, a first sidelink message including a TB precoded using a first precoding matrix of the set of multiple precoding matrices and a second sidelink message including the TB precoded using a second precoding matrix of the set of multiple precoding matrices on a first CC and a second CC of the set of multiple CCs within the shared radio frequency spectrum band. The operations of 1310 may be performed in accordance with examples as disclosed herein. In some examples, aspects of the operations of 1310 may be performed by a sidelink transmission component 830 as described with reference to FIG. 8.

At 1315, the method may include transmitting, via the first CC, the first sidelink message precoded using the first precoding matrix that is selected based on an index of the first CC. The operations of 1315 may be performed in accordance with examples as disclosed herein. In some examples, aspects of the operations of 1315 may be performed by a sidelink transmission component 830 as described with reference to FIG. 8.

At 1320, the method may include transmitting, via the second CC, the second sidelink message precoded using the second precoding matrix that is selected based on an index of the second CC. The operations of 1320 may be performed in accordance with examples as disclosed herein. In some examples, aspects of the operations of 1320 may be performed by a sidelink transmission component 830 as described with reference to FIG. 8.

The following provides an overview of aspects of the present disclosure:

Aspect 1: A method for wireless communications at a UE, comprising: identifying a transmit diversity configuration that indicates a plurality of CCs available for sidelink communication within a shared radio frequency spectrum band; and transmitting, based at least in part on the transmit diversity configuration, a first sidelink message having a first RV of a TB and a second sidelink message having a second RV of the TB on a first CC and a second CC of the plurality of CCs within the shared radio frequency spectrum band.

Aspect 2: The method of aspect 1, wherein identifying the transmit diversity configuration comprises: receiving a control message indicating the transmit diversity configuration.

Aspect 3: The method of any of aspects 1 through 2, further comprising: receiving a sidelink control information message indicating the first CC and the second CC.

Aspect 4: The method of any of aspects 1 through 3, wherein the transmitting comprises: transmitting the first sidelink message on the first CC; and transmitting the second sidelink message on the second CC.

Aspect 5: The method of any of aspects 1 through 4, further comprising: receiving a sidelink control information message indicating that a third sidelink message and a fourth sidelink message respectively transport a third RV and a fourth RV of a second TB; and decoding the second TB based at least in part on monitoring a third CC for the third sidelink message, monitoring a fourth CC for the fourth sidelink message, or both.

Aspect 6: The method of any of aspects 1 through 5, further comprising: transmitting a sidelink control message indicating that the first CC and the second CC respectively transport the first RV and the second RV of the TB.

Aspect 7: The method of any of aspects 1 through 6, wherein the transmitting comprises: transmitting the first sidelink message having the first RV of the TB and the second sidelink message having the second RV of the TB that differs from the first RV.

Aspect 8: The method of any of aspects 1 through 7, wherein the transmitting comprises: transmitting the first sidelink message having the first RV of the TB on the first CC according to a first precoding matrix and the second sidelink message having the second RV of the TB on the second CC according to a second precoding matrix.

Aspect 9: The method of any of aspects 1 through 8, wherein the transmitting comprises: transmitting the first sidelink message on the first CC and the second CC according to a first precoding matrix and the second sidelink message on the first CC and the second CC according to a second precoding matrix.

Aspect 10: The method of any of aspects 1 through 9, wherein the transmitting comprises: transmitting the first sidelink message that comprises first bits of a code block generated based at least in part on the TB; and transmitting the second sidelink message that comprises second bits of the code block that differ from the first bits.

Aspect 11: The method of aspect 10, wherein the first bits comprise one or more first systematic bits of the code block and the second bits comprise one or more second systematic bits of the code block that differ from the one or more first systematic bits of the code block.

Aspect 12: The method of any of aspects 10 through 11, wherein the first bits comprise one or more first systematic bits of the code block and the second bits comprise one or more parity bits of the code block.

Aspect 13: The method of any of aspects 10 through 12, wherein the first bits comprise systematic bits of the code block and first parity bits of the code block and the second bits comprise the systematic bits of the code block and second parity bits of the code block that differ from the first parity bits.

Aspect 14: The method of any of aspects 10 through 13, wherein the transmit diversity configuration indicates a plurality of RVs, each RV of the plurality of RVs corresponds to a different starting location in a circular buffer.

Aspect 15: The method of any of aspects 1 through 14, further comprising: transmitting, via the first CC, a first sidelink control message comprising an indication that the first sidelink message is the first RV of the TB; and transmitting, via the second CC, a second sidelink control message comprising an indication that the second sidelink message is the second RV of the TB.

Aspect 16: The method of any of aspects 1 through 15, further comprising: identifying the transmit diversity configuration based at least in part on an index of the first CC and an index of the second CC.

Aspect 17: The method of any of aspects 1 through 16, further comprising: performing a channel access procedure on each CC of the plurality of CCs, wherein the first CC and the second CC are selected based at least in part on the channel access procedure.

Aspect 18: A method for wireless communications at a UE, comprising: identifying a transmit diversity configuration that indicates a plurality of CCs available for sidelink communications within a shared radio frequency spectrum band and a plurality of precoding matrices; and transmitting, based at least in part on the transmit diversity configuration, a first sidelink message comprising a TB precoded using a first precoding matrix of the plurality of precoding matrices and a second sidelink message comprising the TB precoded using a second precoding matrix of the plurality of precoding matrices on a first CC and a second CC of the plurality of CCs within the shared radio frequency spectrum band.

Aspect 19: The method of aspect 18, wherein the transmitting further comprises: transmitting, via the first CC, the first sidelink message precoded using the first precoding matrix that is selected based at least in part on an index of the first CC; and transmitting, via the second CC, the second sidelink message precoded using the second precoding matrix that is selected based at least in part on an index of the second CC.

Aspect 20: The method of any of aspects 18 through 19, further comprising: receiving a control message indicating the transmit diversity configuration, the first CC, the second CC, or any combination thereof.

Aspect 21: The method of any of aspects 18 through 20, wherein the transmitting further comprises: transmitting the first sidelink message that comprises a first RV of the TB and the second sidelink message that comprises a second RV of the TB.

Aspect 22: The method of any of aspects 18 through 21, wherein the transmitting further comprises: transmitting the first sidelink message that is precoded using the first precoding matrix to generate a first two-antenna single layer transmission; and transmitting the second sidelink message that is precoded using the second precoding matrix to generate a second two-antenna single layer transmission.

Aspect 23: The method of aspect 22, further comprising: transmitting the first sidelink message using a first antenna port of the UE; and transmitting the second sidelink message using a second antenna port of the UE.

Aspect 24: The method of any of aspects 18 through 23, further comprising: generating a first plurality of modulation symbols for the first sidelink message and a second plurality of modulation symbols for the second sidelink message; precoding the first plurality of modulation symbols based at least in part on the first precoding matrix to generate a first plurality of precoded symbols and the second plurality of modulation symbols based at least in part on the second precoding matrix to generate a second plurality of precoded symbols; first mapping the first plurality of precoded symbols to respective subcarriers of a first plurality of subcarriers of the first CC; and second mapping the second plurality of precoded symbols to respective subcarriers of a second plurality of subcarriers of the second CC, wherein the first sidelink message is communicated via the first CC in accordance with the first mapping and the second sidelink message is communicated via the second CC in accordance with the second mapping.

Aspect 25: The method of any of aspects 18 through 24, wherein the transmitting further comprises: transmitting the first sidelink message precoded using the first precoding matrix that is randomly selected from the plurality of precoding matrices; and transmitting the second sidelink message precoded using the second precoding matrix that is randomly selected from the plurality of precoding matrices.

Aspect 26: The method of any of aspects 18 through 25, further comprising: performing a channel access procedure on the plurality of CCs; and selecting the first CC and the second CC based at least in part on the channel access procedure.

Aspect 27: The method of any of aspects 18 through 26, further comprising: generating a first plurality of modulation symbols based at least in part on the first sidelink message; precoding the first plurality of modulation symbols to generate a first plurality of precoded modulation symbols based at least in part on the first precoding matrix; and mapping a respective precoded modulation symbol of the first plurality of precoded modulation symbols to at least one of the first CC or the second CC, wherein the first sidelink message is communicated via the first CC and the second CC based at least in part on the mapping of the first plurality of precoded modulation symbols.

Aspect 28: The method of aspect 27, further comprising: generating a second plurality of modulation symbols based at least in part on the second sidelink message; precoding the second plurality of modulation symbols to generate a second plurality of precoded modulation symbols based at least in part on the second precoding matrix; and mapping a respective precoded modulation symbol of the second plurality of precoded modulation symbols to at least one of the first CC or the second CC, wherein the second sidelink message is communicated via the first CC and the second CC based at least in part on the mapping of the second plurality of precoded modulation symbols.

Aspect 29: An apparatus for wireless communications at a UE, comprising a processor; memory coupled with the processor; and instructions stored in the memory and executable by the processor to cause the apparatus to perform a method of any of aspects 1 through 17.

Aspect 30: An apparatus for wireless communications at a UE, comprising at least one means for performing a method of any of aspects 1 through 17.

Aspect 31: A non-transitory computer-readable medium storing code for wireless communications at a UE, the code comprising instructions executable by a processor to perform a method of any of aspects 1 through 17.

Aspect 32: An apparatus for wireless communications at a UE, comprising a processor; memory coupled with the processor; and instructions stored in the memory and executable by the processor to cause the apparatus to perform a method of any of aspects 18 through 28.

Aspect 33: An apparatus for wireless communications at a UE, comprising at least one means for performing a method of any of aspects 18 through 28.

Aspect 34: A non-transitory computer-readable medium storing code for wireless communications at a UE, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving a control message indicating a transmit diversity configuration that indicates a plurality of component carriers available for sidelink communication within a shared radio frequency spectrum band and that indicates to transmit a first redundancy version of a transport block via a first component carrier of the plurality of component carriers and to transmit a second redundancy version of the transport block via a second component carrier of the plurality of component carriers; and transmitting, based at least in part on the transmit diversity configuration, a first sidelink message having the first redundancy version of the transport block via the first component carrier of the plurality of component carriers and a second sidelink message having the second redundancy version of the transport block via the second component carrier of the plurality of component carriers within the shared radio frequency spectrum band.

2. The method of claim 1, further comprising:

receiving a sidelink control information message indicating the first component carrier and the second component carrier.

3. The method of claim 1, wherein the transmitting comprises:

transmitting the first sidelink message on the first component carrier; and transmitting the second sidelink message on the second component carrier.

4. The method of claim 1, further comprising:

receiving a sidelink control information message indicating that a third sidelink message and a fourth sidelink message respectively transport a third redundancy version and a fourth redundancy version of a second transport block; and decoding the second transport block based at least in part on monitoring a third component carrier for the third sidelink message, monitoring a fourth component carrier for the fourth sidelink message, or both.

5. The method of claim 1, further comprising:

transmitting a sidelink control message indicating that the first component carrier and the second component carrier respectively transport the first redundancy version and the second redundancy version of the transport block.

6. The method of claim 1, wherein the transmitting comprises: transmitting the first sidelink message having the first redundancy version of the transport block and the second sidelink message having the second redundancy version of the transport block that differs from the first redundancy version.

7. The method of claim 1, wherein the transmitting comprises:

transmitting the first sidelink message having the first redundancy version of the transport block on the first component carrier according to a first precoding matrix and the second sidelink message having the second redundancy version of the transport block on the second component carrier according to a second precoding matrix.

8. The method of claim 1, wherein the transmitting comprises: transmitting the first sidelink message on the first component carrier and the second component carrier according to a first precoding matrix and the second sidelink message on the first component carrier and the second component carrier according to a second precoding matrix.

9. The method of claim 1, wherein the transmitting comprises:

transmitting the first sidelink message that comprises first bits of a code block generated based at least in part on the transport block; and transmitting the second sidelink message that comprises second bits of the code block that differ from the first bits.

10. The method of claim 9, wherein the first bits comprise one or more first systematic bits of the code block and the second bits comprise one or more second systematic bits of the code block that differ from the one or more first systematic bits of the code block.

11. The method of claim 9, wherein the first bits comprise one or more first systematic bits of the code block and the second bits comprise one or more parity bits of the code block.

12. The method of claim 9, wherein the first bits comprise systematic bits of the code block and first parity bits of the code block and the second bits comprise the systematic bits of the code block and second parity bits of the code block that differ from the first parity bits.

13. The method of claim 9, wherein the transmit diversity configuration indicates a plurality of redundancy versions, each redundancy version of the plurality of redundancy versions corresponds to a different starting location in a circular buffer.

14. The method of claim 1, further comprising:

transmitting, via the first component carrier, a first sidelink control message comprising an indication that the first sidelink message comprises the first redundancy version of the transport block; and transmitting, via the second component carrier, a second sidelink control message comprising an indication that the second sidelink message comprises the second redundancy version of the transport block.

15. The method of claim 1, further comprising:

identifying the transmit diversity configuration based at least in part on an index of the first component carrier and an index of the second component carrier.

16. The method of claim 1, further comprising:

performing a channel access procedure on each component carrier of the plurality of component carriers, wherein the first component carrier and the second component carrier are selected based at least in part on the channel access procedure.

17. A method for wireless communications at a user equipment (UE), comprising:

identifying a transmit diversity configuration that indicates a plurality of component carriers available for sidelink communications within a shared radio frequency spectrum band and a plurality of precoding matrices; and transmitting, based at least in part on the transmit diversity configuration, a first sidelink message comprising a transport block precoded using a first precoding matrix of the plurality of precoding matrices and a second sidelink message comprising the transport block precoded using a second precoding matrix of the plurality of precoding matrices on a first component carrier and a second component carrier of the plurality of component carriers within the shared radio frequency spectrum band.

18. The method of claim 17, wherein the transmitting further comprises:

transmitting, via the first component carrier, the first sidelink message precoded using the first precoding matrix that is selected based at least in part on an index of the first component carrier; and transmitting, via the second component carrier, the second sidelink message precoded using the second precoding matrix that is selected based at least in part on an index of the second component carrier.

19. The method of claim 17, further comprising:

receiving a control message indicating the transmit diversity configuration, the first component carrier, the second component carrier, or any combination thereof.

20. The method of claim 17, wherein the transmitting further comprises:

transmitting the first sidelink message that comprises a first redundancy version of the transport block and the second sidelink message that comprises a second redundancy version of the transport block.

21. The method of claim 17, wherein the transmitting further comprises:

transmitting the first sidelink message that is precoded using the first precoding matrix to generate a first two-antenna single layer transmission; and transmitting the second sidelink message that is precoded using the second precoding matrix to generate a second two-antenna single layer transmission.

22. The method of claim 21, further comprising:

transmitting the first sidelink message using a first antenna port of the UE; and transmitting the second sidelink message using a second antenna port of the UE.

23. The method of claim 17, further comprising:

generating a first plurality of modulation symbols for the first sidelink message and a second plurality of modulation symbols for the second sidelink message;

precoding the first plurality of modulation symbols based at least in part on the first precoding matrix to generate a first plurality of precoded symbols and the second plurality of modulation symbols based at least in part on the second precoding matrix to generate a second plurality of precoded symbols;

first mapping the first plurality of precoded symbols to respective subcarriers of a first plurality of subcarriers of the first component carrier; and second mapping the second plurality of precoded symbols to respective subcarriers of a second plurality of sub carriers of the second component carrier, wherein the first sidelink message is communicated via the first component carrier in accordance with the first mapping and the second sidelink message is communicated via the second component carrier in accordance with the second mapping.

24. The method of claim 17, wherein the transmitting further comprises:

transmitting the first sidelink message precoded using the first precoding matrix that is randomly selected from the plurality of precoding matrices; and transmitting the second sidelink message precoded using the second precoding matrix that is randomly selected from the plurality of precoding matrices.

25. The method of claim 17, further comprising:

performing a channel access procedure on the plurality of component carriers; and selecting the first component carrier and the second component carrier based at least in part on the channel access procedure.

26. The method of claim 17, further comprising:

generating a first plurality of modulation symbols based at least in part on the first sidelink message;

precoding the first plurality of modulation symbols to generate a first plurality of precoded modulation symbols based at least in part on the first precoding matrix; and mapping a respective precoded modulation symbol of the first plurality of precoded modulation symbols to at least one of the first component carrier or the second component carrier, wherein the first sidelink message is communicated via the first component carrier and the second component carrier based at least in part on the mapping of the first plurality of precoded modulation symbols.

27. The method of claim 26, further comprising:

generating a second plurality of modulation symbols based at least in part on the second sidelink message;

precoding the second plurality of modulation symbols to generate a second plurality of precoded modulation symbols based at least in part on the second precoding matrix; and mapping a respective precoded modulation symbol of the second plurality of precoded modulation symbols to at least one of the first component carrier or the second component carrier, wherein the second sidelink message is communicated via the first component carrier and the second component carrier based at least in part on the mapping of the second plurality of precoded modulation symbols.

28. An apparatus for wireless communications at a user equipment (UE), comprising:

one or more processors;

one or more memories coupled with the one or more processors; and instructions stored in the one or more memories and executable by the one or more processors to cause the apparatus to:

receive a control message indicating a transmit diversity configuration that indicates a plurality of component carriers available for sidelink communication within a shared radio frequency spectrum band that indicates to transmit a first redundancy version of a transport block via a first component carrier of the plurality of component carriers and to transmit a second redundancy version of the transport block via a second component carrier of the plurality of component carriers; and transmit, based at least in part on the transmit diversity configuration, a first sidelink message having the first redundancy version of the transport block via the first component carrier of the plurality of component carriers and a second sidelink message having the second redundancy version of the transport block via the second component carrier of the plurality of component carriers within the shared radio frequency spectrum band.

29. An apparatus for wireless communications at a user equipment (UE), comprising:

one or more processors;

one or more memories coupled with the one or more processors; and instructions stored in the one or more memories and executable by the one or more processors to cause the apparatus to:

identify a transmit diversity configuration that indicates a plurality of component carriers available for sidelink communications within a shared radio frequency spectrum band and a plurality of precoding matrices; and transmit, based at least in part on the transmit diversity configuration, a first sidelink message comprising a transport block precoded using a first precoding matrix of the plurality of precoding matrices and a second sidelink message comprising the transport block precoded using a second precoding matrix of the plurality of precoding matrices on a first component carrier and a second component carrier of the plurality of component carriers within the shared radio frequency spectrum band.

* * * * *